United States Patent
Chebbo et al.

(10) Patent No.: US 9,526,062 B2
(45) Date of Patent: *Dec. 20, 2016

(54) METHOD AND WIRELESS SENSOR NETWORKS

(75) Inventors: Hind Chebbo, Uxbridge Middlesex (GB); Saied Abedi, Reading (GB)

(73) Assignee: FUJITSU LIMITED, Kawasaki (JP)

( * ) Notice: Subject to any disclaimer, the term of this patent is extended or adjusted under 35 U.S.C. 154(b) by 949 days.

This patent is subject to a terminal disclaimer.

(21) Appl. No.: 12/482,009

(22) Filed: Jun. 10, 2009

(65) Prior Publication Data

US 2010/0008256 A1    Jan. 14, 2010

(30) Foreign Application Priority Data

Jun. 10, 2008  (EP) ..................... 08157971

(51) Int. Cl.
*H04W 40/32* (2009.01)
*H04W 84/18* (2009.01)
*H04W 40/04* (2009.01)

(52) U.S. Cl.
CPC ............ *H04W 40/32* (2013.01); *H04W 84/18* (2013.01); *H04W 40/04* (2013.01)

(58) Field of Classification Search
None
See application file for complete search history.

(56) References Cited

U.S. PATENT DOCUMENTS

| | | | | |
|---|---|---|---|---|
| 6,700,893 B1 * | 3/2004 | Radha | ..................... | H04L 47/10 370/252 |
| 6,850,524 B1 * | 2/2005 | Troxel | ..................... | H04L 45/02 370/351 |
| 7,969,919 B1 * | 6/2011 | Snodgrass | ............... | H04L 45/28 370/270 |
| 8,493,943 B1 * | 7/2013 | Segall | ................... | H04W 40/32 370/338 |
| 2002/0018448 A1 * | 2/2002 | Amis | ................ | H04L 29/12254 370/255 |

(Continued)

OTHER PUBLICATIONS

Leonardo L. Fernandes et al., "MVSINK: Incrementally Improving In-Network Aggregation", Mobile ADHOC and Sensor System, 2007, pp. 1-6.

(Continued)

*Primary Examiner* — Chirag Shah
*Assistant Examiner* — Joshua Smith
(74) *Attorney, Agent, or Firm* — Staas & Halsey LLP

(57) ABSTRACT

In a wireless sensor network having a plurality of mobile sensor nodes (62, 63, 64, 65), a sink (70) is provided and re-positioned as required by assigning the role of sink to one of the mobile sensors at a time. Re-positioning involves finding candidate sinks in the vicinity of a current sink, a temporary sink or a central candidate in the network; judging the suitability of each candidate, for example by estimating the data throughput likely to be achieved if each candidate is selected as the new sink; and transferring the role of sink to the best candidate found. The temporary sink or central candidate may be selected with the aid of a positioning system (80) of the network. Suitability of a candidate sink may take into account a desired transmission rate of each sensor node in the vicinity of a candidate, this desired rate being found from a 3-D look-up table of each sensor.

10 Claims, 21 Drawing Sheets

(56) References Cited

U.S. PATENT DOCUMENTS

| | | | | |
|---|---|---|---|---|
| 2002/0085498 | A1* | 7/2002 | Nakamichi | H04L 12/2602 370/236 |
| 2003/0147386 | A1* | 8/2003 | Zhang et al. | 370/390 |
| 2004/0090943 | A1* | 5/2004 | da Costa et al. | 370/338 |
| 2004/0203787 | A1* | 10/2004 | Naghian | H04W 36/08 455/437 |
| 2005/0195795 | A1* | 9/2005 | Aoki | H04W 40/02 370/351 |
| 2006/0178150 | A1* | 8/2006 | Kim | 455/445 |
| 2006/0227740 | A1* | 10/2006 | McLaughlin et al. | 370/329 |
| 2007/0078817 | A1* | 4/2007 | Girao et al. | 707/2 |
| 2007/0121564 | A1* | 5/2007 | Petersen | H04W 8/06 370/338 |
| 2007/0264936 | A1* | 11/2007 | Kim et al. | 455/45 |
| 2008/0175257 | A1* | 7/2008 | Winter | H04W 40/248 370/411 |
| 2008/0247353 | A1* | 10/2008 | Pun | H04L 45/46 370/328 |
| 2008/0253327 | A1* | 10/2008 | Kohvakka et al. | 370/330 |
| 2009/0059795 | A1* | 3/2009 | Fonseca, Jr. | H04W 84/18 370/236 |
| 2009/0141898 | A1* | 6/2009 | Huang | 380/270 |
| 2010/0008272 | A1* | 1/2010 | Messinger | H04Q 9/00 370/311 |
| 2010/0098090 | A1* | 4/2010 | Westhoff et al. | 370/400 |
| 2011/0188378 | A1* | 8/2011 | Collins | H04L 41/042 370/236 |

OTHER PUBLICATIONS

Min Meng et al., "Energy Efficient Routing in Multiple Sink Sensor Networks", Computational Science and Its Applications, 2007, International Conference, Piscataway, NJ, Aug. 1, 2007, pp. 561-566.

Akkaya K et al., "A survey on routing protocols for wireless sensor networks" AD HOC Networks, Elsevier, vol. 3, No. 3, May 1, 2005, pp. 325-349.

Hasanizadeh R., et al., "Energy Efficiency of Adaptive-Rate Medium Access Control Protocols for Sensor Networks" Proceedings of World Academy of Science, Engineering and Technology, vol. 13, Jun. 2006.

Yufu Jia et al., "Analysis on Energy Cost for Wireless Sensor Networks" Embedded Software and Systems, 2005, Second International Conference, China Dec. 16-18, 2005, pp. 144-151.

European Search Report mailed Dec. 23, 2008 and issued in corresponding European Patent Application 08157971.6.

European Search Report mailed Feb. 25, 2009 and issued in corresponding European Patent Application 08157971.6.

European Search Report dated Feb. 25, 2009 in corresponding European Patent Application 08157971.6.

Akkaya K. et al., "A survey on routing protocols for wireless sensor networks" AD HOC Networks, Elsevier, vol. 3, No. 3, May 1, 2005, pp. 325-349.

Hasanizadeh R, et al., "Energy Efficiency of Adaptive-Rate Medium Access Control Protocols for Sensor Networks", Proceedings of World Academy of Science, Engineering and Technology, vol. 13, Jun. 2006.

Yufu Jia et al., "Analysis on Energy Cost for Wireless Sensor Networks" Embedded Software and Systems, 2005, Second International Conference, China, Dec. 16-18, Piscataway, NJ, Dec. 16, 2005, pp. 144-151.

European Search Report dated May 26, 2010 and issued in corresponding European Patent Application 10156158.7.

* cited by examiner

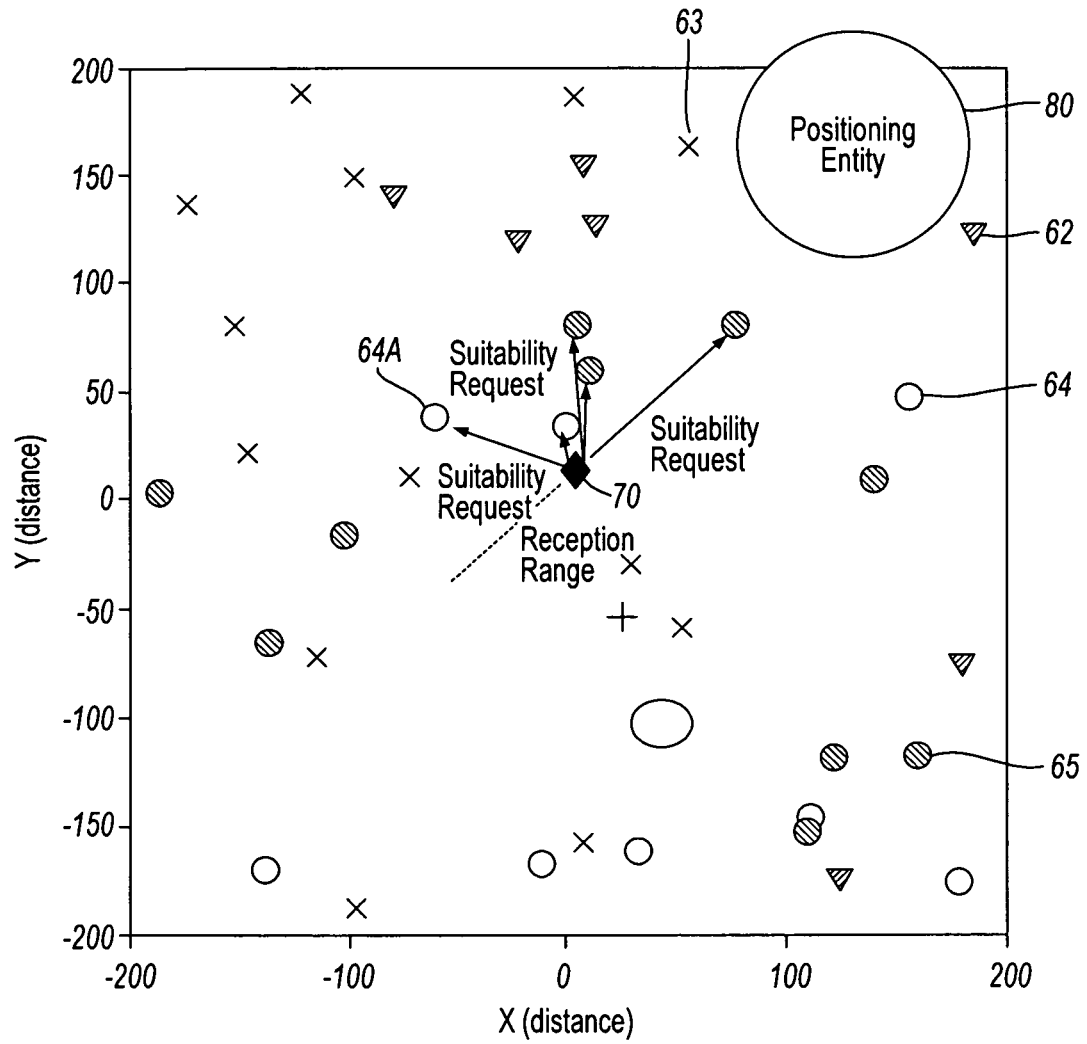
Fig.5
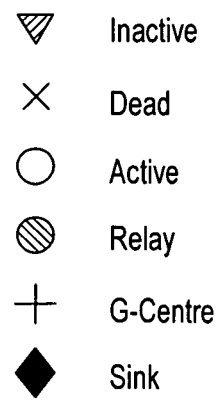

METHOD AND WIRELESS SENSOR NETWORKS

FIELD OF THE INVENTION

The present invention relates to wireless sensor networks and more particularly to sink (base station) positioning in such networks.

BACKGROUND OF THE INVENTION

Recently, the concept of the wireless sensor network (WSN) has received considerable attention. A WSN typically includes a collection of low-power transceivers (henceforth called sensors) each having some kind of sensor function for one or more properties of an environment in which they are placed. The term "environment" here has a very broad meaning and could include, for example:—a geographical area such as a farmer's field, an area of ground requiring monitoring for security reasons, or a volcano; a specific facility such as an industrial plant, a hospital, a retail store or financial institution; or a human body. Likewise, the range of properties which might be sensed is wide, including temperature, pressure, sound, vibration, motion, the presence of specific chemicals, etc.

Each sensor is capable of transmitting sensor data, usually as discrete packets, to any other devices in its vicinity, usually to another sensor. By relaying data from one sensor to another, the sensed data can be directed to a so-called sink or base station and gathered (temporarily stored). Although the precise communication standard used by the sensors is not important, one suitable standard is IEEE802.15.4, a current implementation of which is called ZigBee.

Depending upon the capabilities of the sink, the data can be forwarded from the sink directly or indirectly to some form of outside entity, typically via another network such as a mobile telephone network or the Internet. Where the sink is able to communicate with another network it can also be called a gateway (GW).

In some implementations, the terms sink, base station and gateway mean the same thing; in others they denote distinct functions, in which case the sink will communicate the gathered data to a separate base station and/or gateway for further transmission, possibly after some kind of aggregation or other processing.

In a type of WSN relevant to the present invention, each of the sensors (or a subset thereof) is also capable of acting as the sink. Multiple sinks, and multiple gateways, may be present in a WSN but for simplicity, a single sink is assumed in the following description.

In the present specification, the terms "sink" and "base station" are used synonymously.

Some possible applications of WSNs are shown in FIG. 1. A WSN applied to the human body is called a Body Area Network (BAN), as indicated at 10 in the upper part of FIG. 1. In this instance, the sensors 12 might monitor body functions such as heartbeat and blood pressure, and transmit their data to a sink or gateway 14 in the form of a portable computing apparatus such as a mobile phone, PC or PDA. As indicated this would normally have a wireless link, via another network 50, to an external data server 16 for analysis and forwarding on, if necessary, to a data centre ("SBS Platform") 18, allowing decisions to be taken based on the sensed data. For example, changes in the heartbeat of a hospital patient might lead to a decision to signal medical staff to attend to the patient.

The left-hand lower part of FIG. 1 depicts a WSN 20 applied to a geographical area, for example to monitor environmental conditions such as air quality. Such a WSN is also termed an Environment Sensor Network or ESN. By being scattered over a geographical area, the sensors 22 are essentially fixed in this application. As indicated, the sensors might communicate using the above-mentioned Zigbee standard with the data being routed to a gateway GW 24 for further transmission over network 50.

Next to this in FIG. 1 is indicated another form of WSN 30 in which the nodes are sensors on board vehicles 32, and are thus mobile. In this case the network is provided with a gateway 34 which might be fixed to a mast at a traffic intersection for example, or might itself be mobile by mounting it on another vehicle. Again, monitoring of pollution is one possible application. Although not shown in FIG. 1, each individual vehicle 32 may also have its own WSN formed by sensors at various points in and on the vehicle, for monitoring parameters such as speed, temperature, tyre pressure and so forth. Such a WSN is an example of an Object Sensor Network or OSN.

The lower right-hand part of the Figure indicates a WSN 40 for assisting with disaster prediction, recovery, or prevention. As before, sensors 42 are scattered around a geographical area to be monitored, with a gateway 44 for receiving the sensor data and forwarding the same over network 50 to server 16. By raising alarms in response to sensor data from buildings, the ground or the atmosphere, rescue operations can be started more quickly to deal with earthquakes, fire or flooding. Compared to conventional monitoring networks, WSNs are cheaper to deploy and at the same time they provide more powerful and accurate real-time tools to acquire the data.

As will be apparent from FIG. 1, in general the sensors of a wireless sensor network may be fixed or mobile, and the sink may be fixed or mobile. However, the present invention concerns a WSN in which at least some of the sensors are mobile and one of the mobile sensors at a time acts as the sink, the sensor selected for this purpose being able to be changed in the manner to be described later.

Commonly, the sensors are unattended devices of low computational ability and reliant on battery power; thus, power consumption of sensors is a major consideration. Transmission of data is typically the most power-hungry function of a sensor. For this reason, it is preferable for a sensor to communicate only with its nearest neighbours, necessitating the use of multi-hop techniques to enable data to reach the sink by several different routes. Another technique employed to conserve battery power is to deactivate sensors which are not currently engaged in sensing or communication (including relaying). Thus, sensors may alternate between active and inactive states (also called "awake" and "asleep"), for example in response to the presence or absence of a sensed property or incoming data. In this way the useful lifetime of the sensor can be prolonged. However, unless a sensor has some way to replenish its power, its battery will eventually become exhausted, at which point it assumes a "dead" state. Dead sensors reduce the coverage of the network and restrict the number of available routes for data, to the point where in the worst case, the WSN is no longer operable. Consequently, related to the need to conserve battery power of sensors is the desire to keep each sensor "alive" for as long as possible. This is particularly challenging when the sensors are moving, for example as a result of being mounted on a vehicle or a human body.

As will be apparent from the above discussion, it is possible to define one of a limited number of states for each sensor at a given point in time. The sensor may be "active", in the sense of transmitting its own sensed data; it may be acting as a relay (this is distinguished from "active" for present purposes); it may be acting as the sink for receiving data; it may be "inactive" due to not having any data to transmit, relay or receive; or it may be dead owing to lack of a power source. The concept of the "state" of a sensor is important for managing the network, as explained in more detail below.

Another consideration, of particular relevance to the present invention, is appropriate positioning of the sink. Generally, the sensors transmit data in all directions indiscriminately without knowing or caring which other nodes receive it. A sink far from the more active part(s) of a wireless sensor network will tend to receive less data, with greater delay (latency), and incur more power expenditure by the sensors, than one placed closer to the active part(s). In a sparse WSN (one having relatively few sensors for the geographical area covered), some positions of the sink may not allow the sink to communicate with all parts of the WSN. Conversely, in a dense WSN there is generally no problem for all sensors to reach the sink, but those sensors closest to the sink will tend to suffer high power drain owing to the large demands on them for relaying sensor data to the sink. This will tend to drain the available power in a short time if the sink stays still.

Thus, it is unlikely that a fixed sink will remain optimally positioned for any length of time. By its nature, a wireless sensor network has a constantly-changing configuration, owing to changes of state of the sensors, their movements if any, and changes in the property or properties being sensed, so the appropriate position for the sink is liable to change frequently, possibly over quite short timescales.

In one form of wireless sensor network, the sensors are RFID-based devices which might not be reliant on a battery power, but as the available transmission power of such devices is very low, similar considerations still apply regarding placement of the sink.

Thus, dynamic repositioning of the sink in a wireless sensor network has been proposed as a technique for increasing sensor lifetime whilst improving the quality and throughput of communications over the WSN and reducing the potential delays.

Unfortunately, it has been shown that the problem of sink positioning in a WSN is an "NP-complete" problem and thus difficult to solve with the very limited computing resources available in the WSN. Moreover, physically moving a single sink to an appropriate location is only feasible for some WSN applications. Even in a system configuration which allows for the sink to be mobile, for example by mounting it on a vehicle or robot, such physical movement of the sink tends to be inherently slow and unreliable.

Accordingly, it is desirable to find a solution for sink positioning in a WSN which does not rely on physically moving the same sink around the network.

It is further desirable to provide a technique for sink positioning which takes account of the needs of the sensors in terms of data to be transmitted.

SUMMARY OF THE INVENTION

According to a first aspect of the present invention, there is provided a method of locating a sink in a wireless sensor network, the wireless sensor network comprising sensors at least some of which are capable of acting as the sink and one of which is currently acting as the sink, the method comprising:

selecting two or more of said sensors as candidate sinks;

finding the suitability of each candidate sink to act as the sink using a calculation producing a result indicating the suitability of the candidate sink for communication with a plurality of the sensors;

comparing the result for each candidate sink to determine the most suitable candidate sink; and transferring the role of the current sink to the most suitable candidate sink thus found.

Here, it is possible that the current sink is found to be the most suitable candidate, in which case the transferring step would not actually change the sink.

In this method, preferably, possible states for said sensors in addition to acting as the sink include active and relay states, and said selecting step comprises selecting active or relay sensors among said sensors.

In one form, the method involves use of a positioning entity with knowledge of the locations of the active and relay sensors, the method further comprising, prior to said selecting step, the positioning entity choosing a "lead" sensor for carrying out the method. Preferably, the positioning entity determines a "centre of gravity" of the active and relay sensors and selects, as the lead sensor, a sensor close to the centre of gravity.

The lead sensor may be made a temporary sink prior to the selecting step, taking over from the current sink. This is the first embodiment described below. By making a "central" candidate into a temporary sink immediately, the transfer of data to the new sink to be selected by the method may be speeded up, and made more reliably.

Alternatively, the lead sensor is made a central candidate for the purpose of the selecting and subsequent steps, but the current sink remains as the sink until the transferring step. This is referred to as a "Modification of the first embodiment" below. Preferably, in this case, the transferring step involves the most suitable candidate sink instructing the current sink to relinquish its role.

In either case, each sensor will generally have a limited communication range with other sensors, in which case, preferably, the finding step comprises the lead sensor requesting data from candidate sinks comprising each of the active and relay sensors within its range;

each candidate sink requesting at least the active and relay sensors within its communication range to provide at least its location and state, and transmit a reference signal, to the candidate sink; and each candidate sink calculating a transmission rate possible with each of the active and relay sensors within its communication range and notifying a result to the lead sensor.

Preferably, the total transmission rate for all the active/relay sensors within range is found and transmitted to the current sink.

After that, preferably, the comparing step comprises the lead sensor comparing the results received from the candidate sinks to determine which candidate sink can provide the maximum throughput.

In another form of the method, each sensor has a certain communication range with other sensors and knowledge of its own location, and the selecting step comprises the current sink signalling its own location to all active and relay sensors within its communication range, whereupon each of the active and relay sensors receiving said signalling from the current sink becomes a candidate sink and likewise signals its location to all active and relay sensors within its range. This is the second embodiment explained below.

If, in addition, each sensor has knowledge of its current energy level and buffer occupancy then upon receiving location information from a candidate sink, it may use these parameters to derive and transmit a desired transmission rate. Here, the candidate sinks also include the current sink.

Then each sensor, upon receiving a signal from a candidate sink, transmits a reference signal used by the candidate sink to estimate the channel between the sensor and the candidate sink, and each candidate sink derives and transmits a measure of the probability of fulfilling the desired transmission rate for each of the sensors over each channel so estimated, as said result indicating the suitability of the candidate sink for communication with a plurality of the sensors.

In this form of the method, the comparing step comprises the current sink comparing the results received from the candidate sinks to determine which candidate sink (including itself) can provide the maximum throughput.

According to a second aspect of the invention, there is provided a wireless sensor network operating in accordance with any of the above methods.

According to a third aspect of the present invention, there is provided a sensor for use in a wireless sensor network comprising:
 a wireless transceiver arranged to transmit sensor data and to receive data including a location of a candidate sink;
 a sensor for generating sensor data;
 a memory for storing sensor data and the sensor's location in the network;
 an energy source; and
 desired rate finding means for finding, based on an energy capacity of the energy source, the amount of the sensor data, and the distance between the sensor location and a candidate sink location, a desired transmission rate to transmit sensor data to the candidate sink.

Here, the desired rate finding means may be a three-dimensional look up table which is indexed by the energy capacity, data amount and distance to yield a value for the desired rate.

According to a fourth aspect of the present invention, there is provided a device capable of acting as both a sensor and a sink in a wireless sensor network having a plurality of such devices, the device comprising:
 wireless transceiver means for receiving and transmitting data within a communication range;
 selecting means operable, when the device assumes the role of a central device, to select as candidate sinks two or more other said devices within the communication range;
 calculating means operable to provide a measure of the suitability of the device for communication with a plurality of the sensors, the transceiver means being arranged to transmit said measure to the central device; and
 decision means operable, when the device is the central device, to determine the most suitable candidate sink based on said measure.

The device may assume the role of said central device by being made the current sink or a temporary sink. Alternatively, it is arranged to be responsive to a designation as a "central candidate" to take the lead role in the steps of the method, with the sink role remaining with the current sink until completion of the method.

Preferably, the method is initiated by the current sink, or if present, the positioning entity, in response to a predetermined trigger event such as a change in an amount of data received by the current sink, or elapse of a defined time interval.

According to a further aspect of the invention, there is provided software which, when executed by a processor of a radio device in a wireless sensor network, provides the above sensor and/or the above sensor/sink device.

Thus, embodiments of the present invention take advantage of existing sensors in the network and their movements to provide the sink, by re-assigning the role of sink among the sensors in dependence upon which of a plurality of the sensors is best able to take on the role of sink.

BRIEF DESCRIPTION OF THE DRAWINGS

Reference is made, by way of example only, to the accompanying drawings in which:

FIGS. 4 to 9 show successive steps in a method of a first embodiment of the present invention;

DETAILED DESCRIPTION

Figure 1:
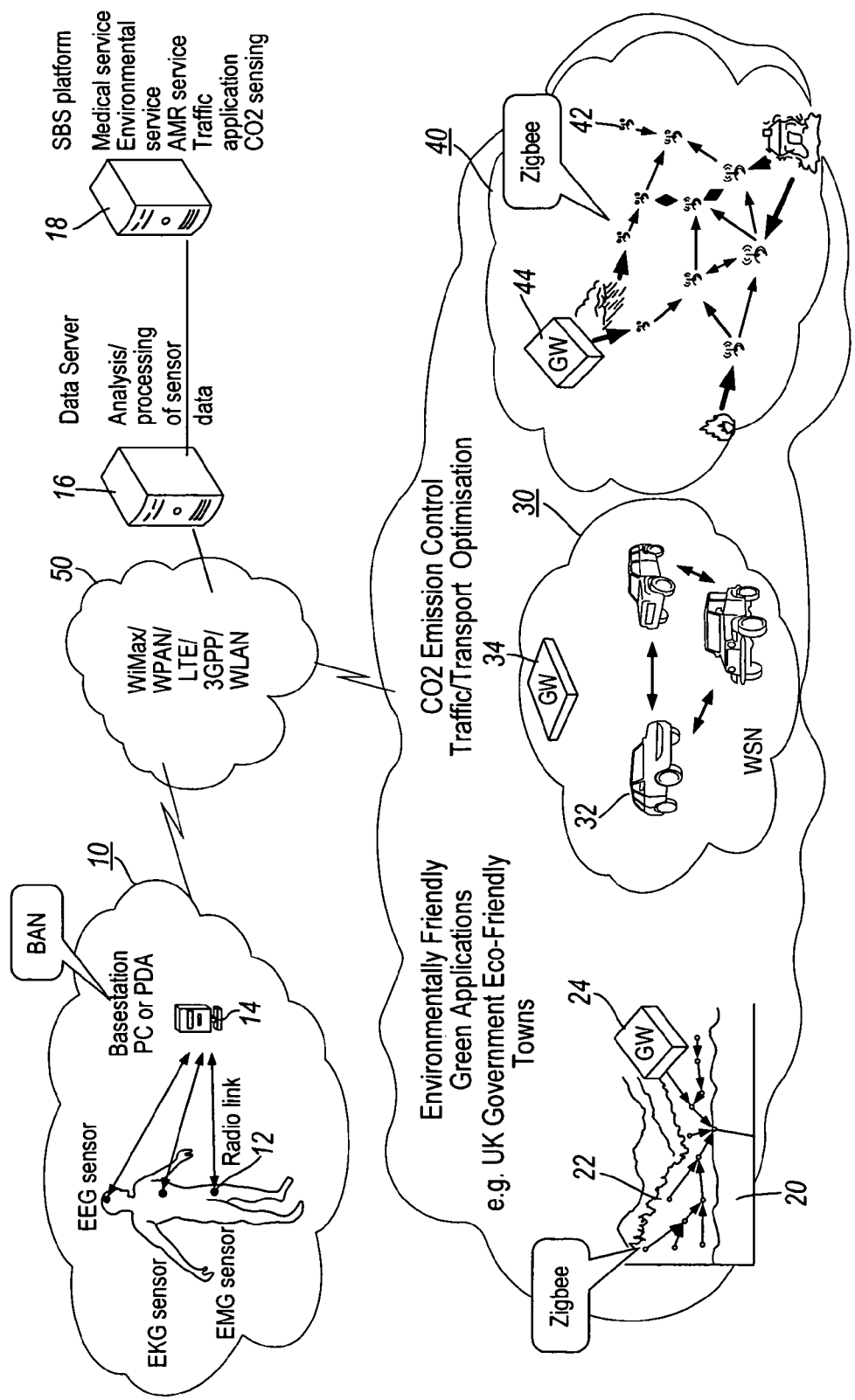
FIG. 1 illustrates some possible applications of wireless sensor networks (WSNs)

Before describing the preferred embodiments of the present invention, a brief explanation will be given of the theoretical background.

We assume that a number of sensors is allocated in a wireless sensor network, and that only one sink or Base Station is available for this WSN. It is also assumed that any sensor may attempt to transmit data packets to the sink. A sensor by definition can act as a transmitter (i.e. active sensor), it can be out of action due to the lack of energy in the sensor battery (i.e. dead sensor), it can be inactive due to lack of packets, it can act as a relay or it can act as a sink. Therefore we define the sensor states as:

$$C_i = [c_1 \ c_2 \ c_3 \ c_4 \ c_5] \quad (1)$$
$$= [\text{Sink, Inactive, Active, Relay, Dead}], i = 1, 5$$

It is assumed that packets are transmitted by the sensors either directly or through relays (i.e., other sensors) to the sink. Each communication hop from a sensor to a relay, relay to sink etc. is referred to below as a "link" having a "channel". Each sensor can change its state on an autonomous basis or in harmony with other sensors. Each event is defined as a point of time at which the state of one or more sensors changes.

A communications channel in the WSN is modelled, for example, as follows. Using an equation well known from communication theory, a packet transmission signal between any two sensor nodes, or between a sensor and sink, can be represented by:

$$y(t) = d^{-\alpha/2} \cdot h(t) \cdot x(t) + \eta(t) \quad (2)$$

where t is the current time, y(t) is the received signal, d is the distance between the sensor nodes, α is the path loss component of the channel, h(t) is the channel gain describing the fading between the two sensor nodes, x(t) is the transmitted signal, and η(t) is noise. It is assumed that the radio channel is a Rayleigh flat-fading channel, varying randomly anywhere between a perfect channel and no channel at all, which can be expressed as h(t)~CN(0,1). It is assumed that the radio channel remains constant during the packet transmission, but may change over time to a time varying fading channel.

Given a channel h(t), the maximum rate at which reliable communication is possible at time t is represented as:

$$I(t) = \log\left(1 + \frac{P_x |h[t]|^2}{d^\alpha N_0}\right) \quad (3)$$

where the transmission power $P_x$ depends on the energy available at the transmitting sensor. Here, $N_0$ is the standard deviation of the noise component η(t). It is assumed that in the current fading environment the maximum rate I(t) for a reliable communication is random as well.

The following simple energy consumption model can be used to describe the instantaneous energy variations in the sensor battery:

$$\varepsilon(t) = \varepsilon_0 - \sum_{m=1}^{t-1} \varepsilon_{c_m} \quad (4)$$

where $\varepsilon_0$ is the initial energy value, $c_m$ is one of the sensor states at time m, and $\varepsilon_c$ is the energy expended (consumed) in state c during each time step t. It is assumed that states of sensors change in discrete time steps, and that between successive time steps all conditions remain the same. In the subsequent description, time t is the current time (present time step) in the network.

Figure 2:
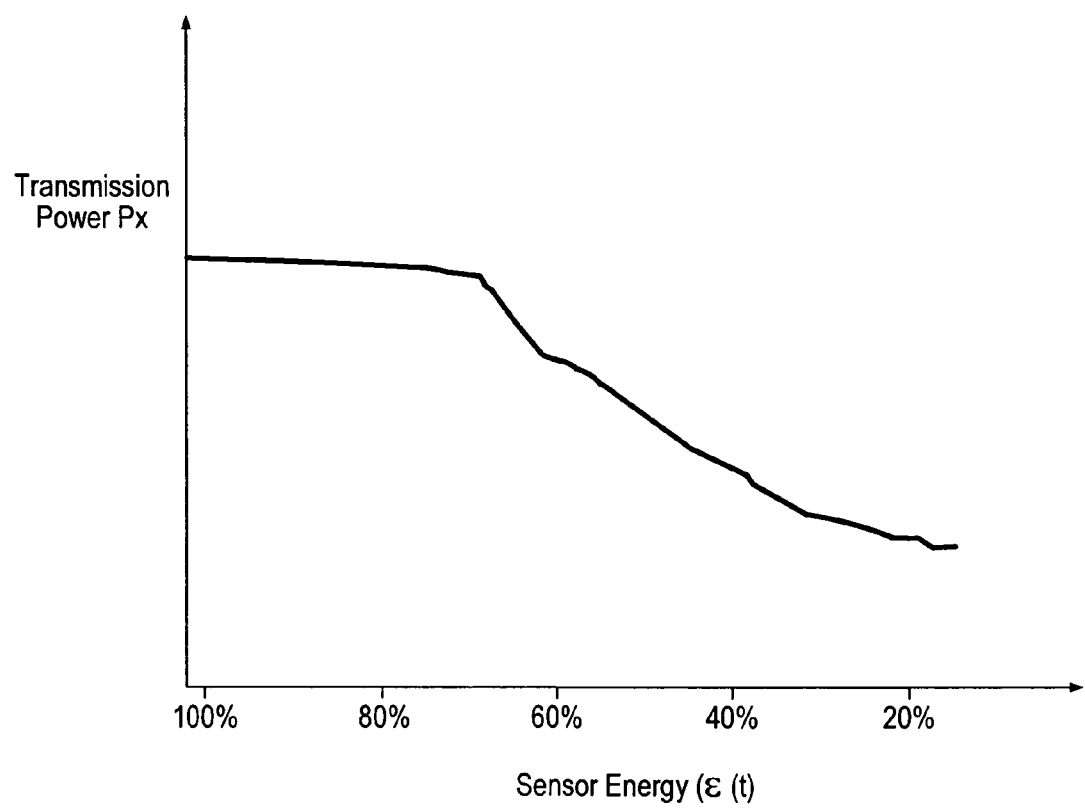
FIG. 2 shows a relationship between transmission power and sensor energy in a WSN.

It is assumed that available transmission power $P_x$ is a function of available remaining energy. An example of this relationship is shown in FIG. 2, from which it is clear that declining energy leads to declining transmission power.

Figure 3A:
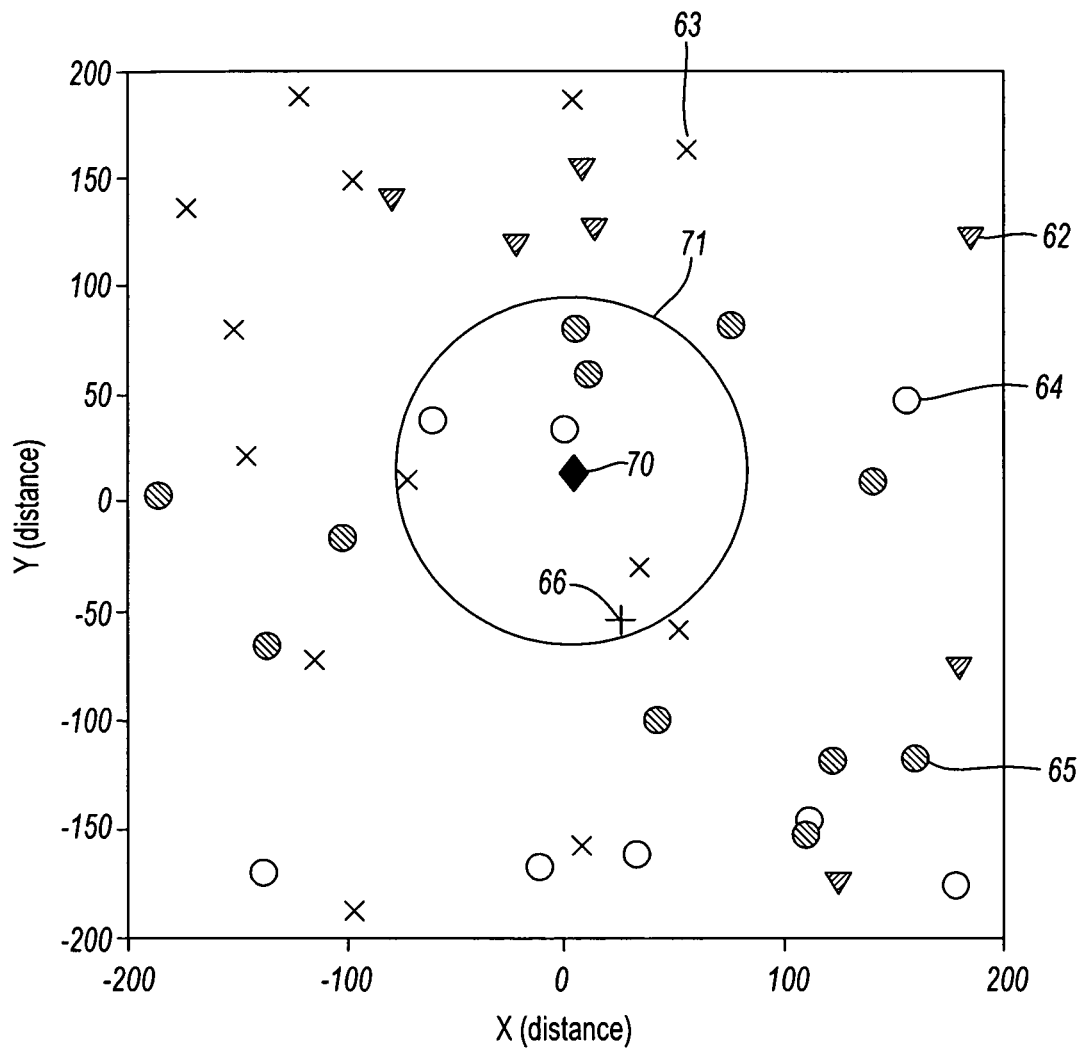
FIG. 3A shows a typical configuration of a WSN to which the present invention is applied.

FIG. 3A conceptually shows a WSN 60 to which the present invention is applied. The horizontal and vertical axes represent distance (in arbitrary units) over an area covered by the WSN. As indicated, the mobile sensors may be positioned anywhere in the area considered, and in accordance with the possible states referred to above, they include inactive sensors 62, dead sensors 63, active sensors 64, relay sensors 65 and a sink 70. It is assumed that at any given point in time, only one of the sensors is actually active as a sink 70. Not all sensors in the network need be equipped to take on the sink role.

As indicated in the Figure, the sink 70 will typically only have a limited reception range 71, and thus can only communicate directly with a subset of the sensors and grid points. A point 66 marks the so-called "centre of gravity" of the sensors. This may be calculated, for example, based on the geographical centre of the sensors within the network, or within range of the sink taking into account the positions of all the currently-active sensors, or may take into account other factors too such as amounts of data at each sensor.

Note that owing to the capability for multi-hop communication as referred to above, the limited range of communication of the sink does not necessarily prevent the sink from gathering information from the whole WSN.

Figure 3B:
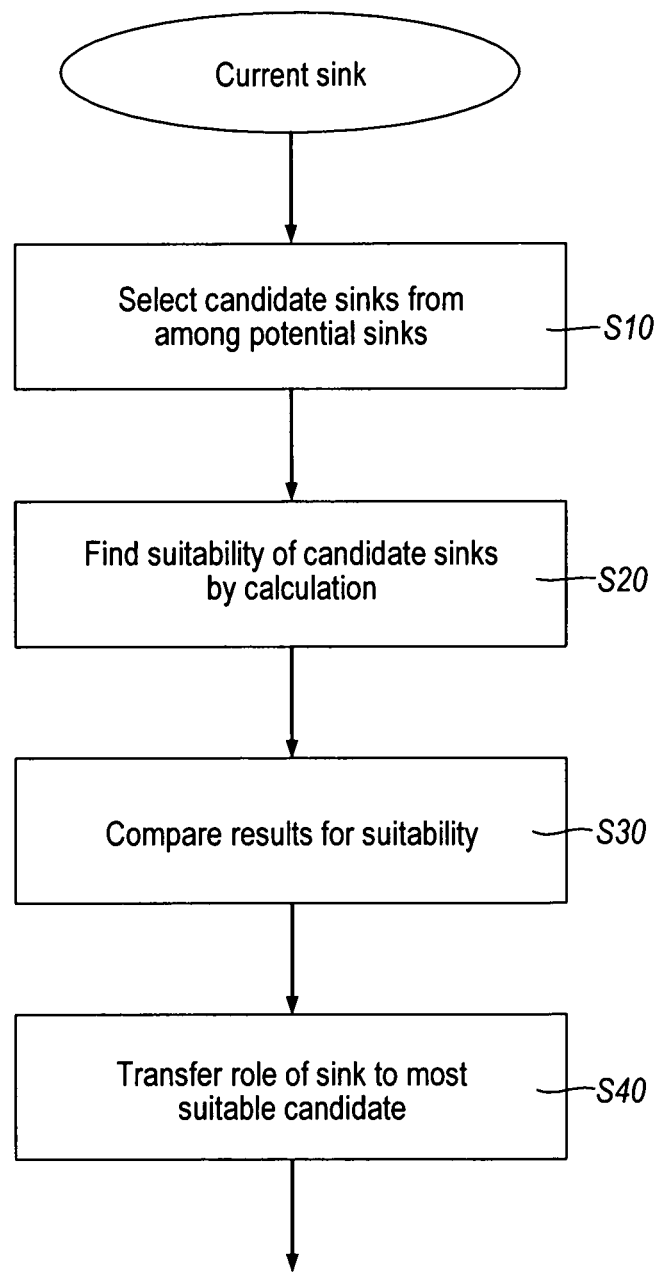
FIG. 3B is a flowchart of steps in methods embodying the present invention.

FIG. 3B is a flowchart of essential steps in a method embodying the present invention. As will be seen, the method proceeds on the assumption that there is a currently-active sink in the network. To transfer the role of sink, first some suitable candidates are selected (step S10) from among some potential sinks. Then (S20) the suitability of each candidate is found by calculation of particular metrics to be described. Then (S30) the results of the calculations are compared to find the best candidate among the potential sinks. Finally (S40) the role of the current sink is transferred to the most suitable candidate thus found.

First Embodiment

A first embodiment of the present invention will now be described with reference to FIGS. 4 to 9, showing steps of a sink positioning method.

The first embodiment takes into account changes of the maximum transmission rate I(t) for different communication links from sensor to sink, which changes occur due to movements of sensors and their changes of status as well as (possibly) changes in ambient conditions.

1. The method of the present invention has to be triggered in some way. The trigger for the following steps may be provided by the current sink, i.e. one of the sensors, observing a significant reduction in data it receives (for example, the amount of data per unit time falling below a predetermined threshold). The cause of such a reduction might be, for example, failure of a nearby sensor/relay, but the sink would not normally know this directly. A steady or increasing data throughput to the sink would not normally be a trigger for performing the method. However, the method could be triggered periodically regardless of the incoming data, to check whether the current sink positioning is appropriate.

Figure 4:
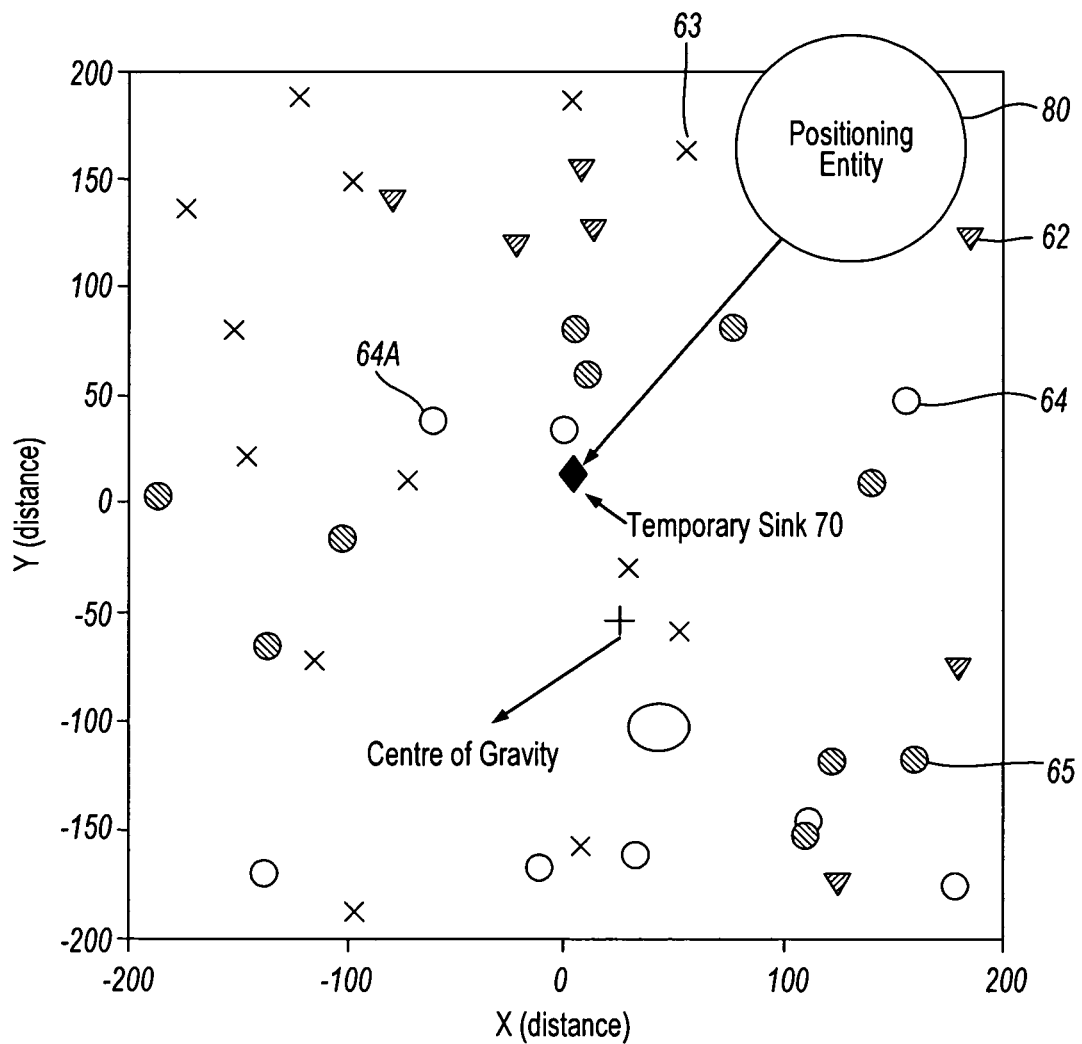

2. The WSN is equipped with a positioning system (see Positioning Entity 80 in FIG. 4) which is capable of determining and knowing the current centre of gravity of active and relay sensors in the wireless sensor networks. If there is a sensor which is currently closer to the centre of gravity than current sink, that potential candidate sensor is informed by that entity that it is the new temporary sink as shown in FIG. 4. The reason for this is that the current centre of gravity of the network is a good starting point for locating the sink. Thereafter, the sink can be repositioned using the subsequent steps. Incidentally, the way in which Positioning Entity 80 is shown in FIG. 4 and the subsequent Figures is only conceptual; its physical location relative to the network is unimportant. Although Positioning Entity 80 is shown in the subsequent Figures after FIG. 4 for consistency, it is not involved in the remaining steps which are conducted among the sensors by themselves.

3. The temporary sink 70 sends a signal that asks at least active and relay sensors within the range to evaluate their suitability to become a new sink as shown in FIG. 5. Obviously, "dead" sensors would not participate in this process, and normally, nor would "inactive" (sleeping) sensors. In the case where a sensor is not in a position to become the sink (perhaps due to inadequate power or computational resources) the sensor might simply decide to take no action, or might return a suitable notification of this decision to the temporary sink.

Figure 6:
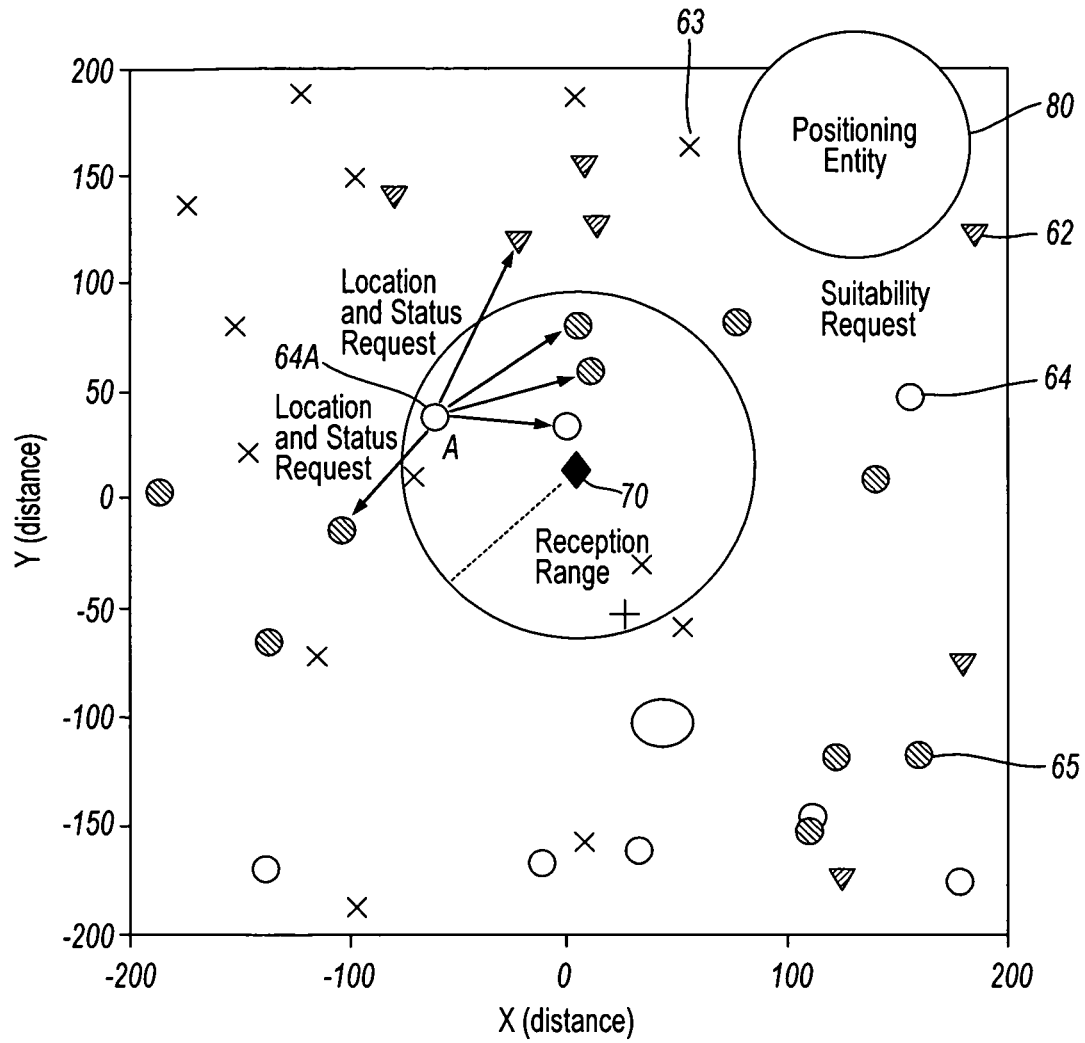

4. Each sink candidate (including the temporary sink) as shown in FIG. 6 asks their surrounding sensors to report back their status and location (in the Figure this is shown only for one of candidate sensors, active sensor 64A). It is assumed that inactive sensors will not respond, and will not be involved in the subsequent calculations; however, in certain applications it could be desirable to "wake up" the inactive sensors so as to involve them in this process.

Figure 7:
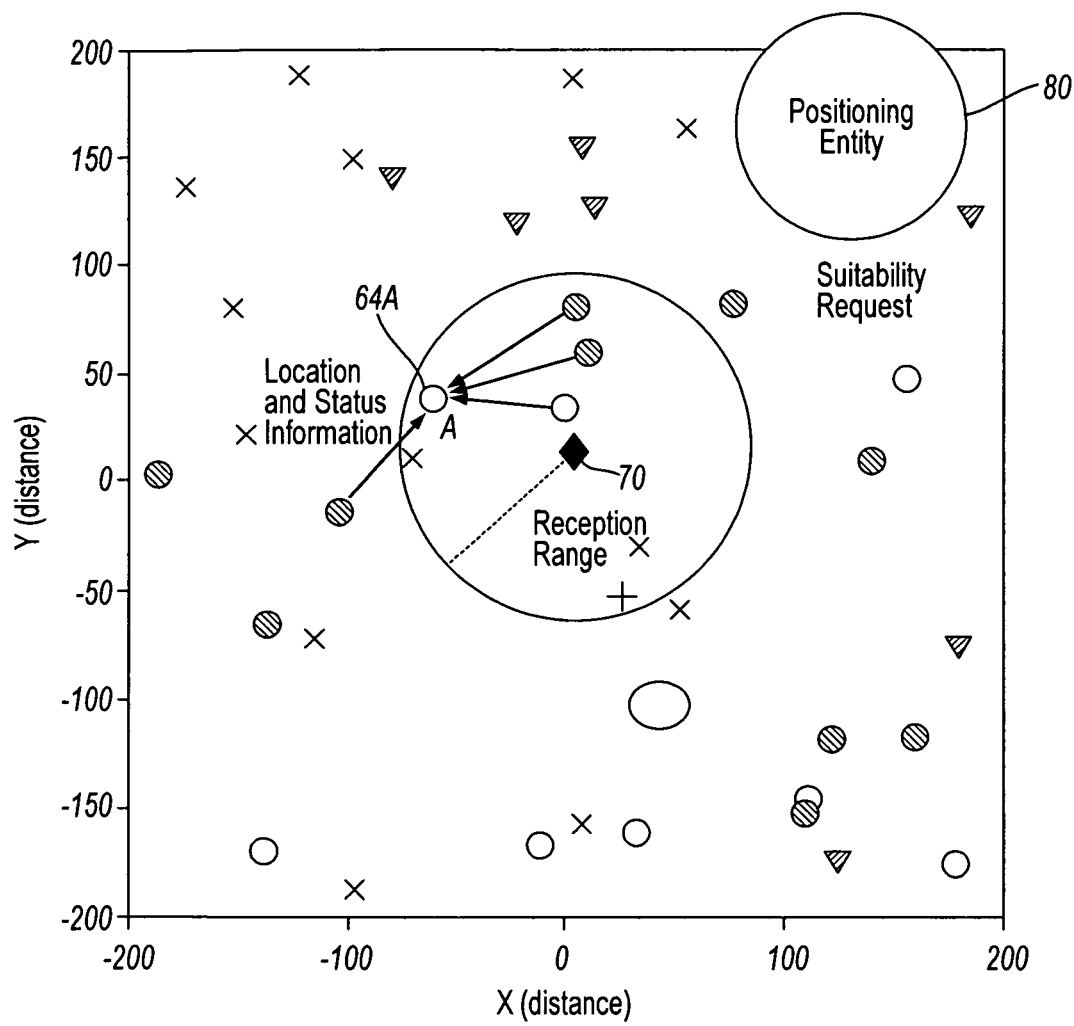

5. Each candidate sink then receives the state and location information as shown in FIG. 7, and identifies approximately which sensors are currently within its reception range. In other words the potential candidate sink stores some form of representation of the sensor network in its neighbourhood, identifying sensors by their location and recording the state of each.

6. Each candidate sink point asks sensors to send a reference signal which will be employed to determine or estimate the channel information $h_{sx}(t)$ between the sink candidate s and each sensor node x.

7. Each candidate sink point then determines the maximum rate at which reliable communication is possible at time t between the grid point at potential location j and each relay or active sensor node i as:

$$I_{ji}(t) = \log\left(1 + \frac{P_i|h_{ji}[t]|^2}{d_{ji}^\alpha N_0}\right) \quad (5)$$

8. The candidate sink point then determines the total maximum rate for current active and relay links associated with it:

$$I_j(t) = \sum_{i=1}^{K}(I_{ji}(t)) = \sum_{i=1}^{K}\left(\log\left(1 + \frac{P_i|h_{ji}[t]|^2}{d_{ji}^\alpha N_0}\right)\right) \quad (6)$$

where K is the number of active relay and sensor nodes in the current location.

Figure 8:
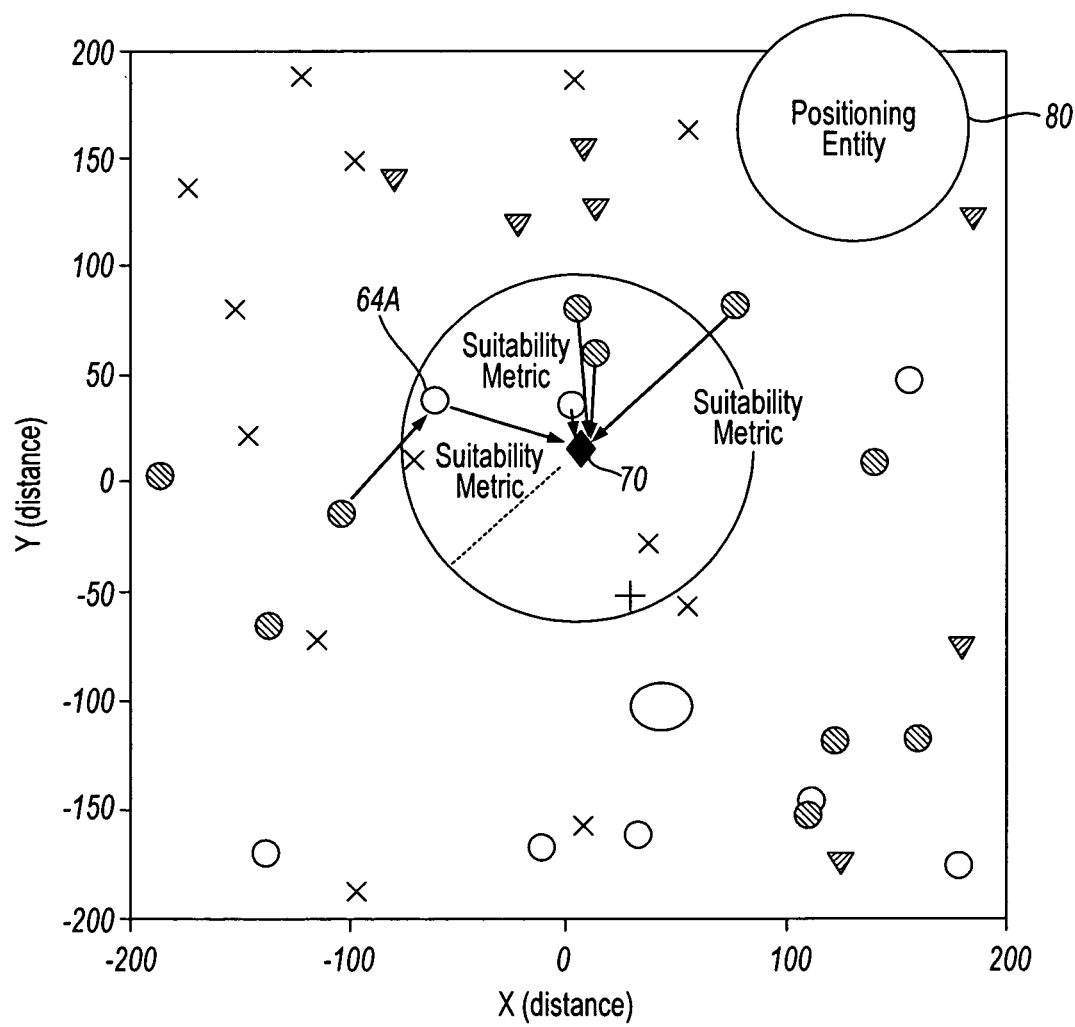

9. All the candidates signal an indication of the $I_j(t)$ to the temporary sink as shown in FIG. 8.

10. The temporary sink then determines the sensor that can provide the maximum achievable throughput:

$$J(t) = \underset{j}{\operatorname{argmax}}(I_j(t)) \quad (7)$$

Figure 9:
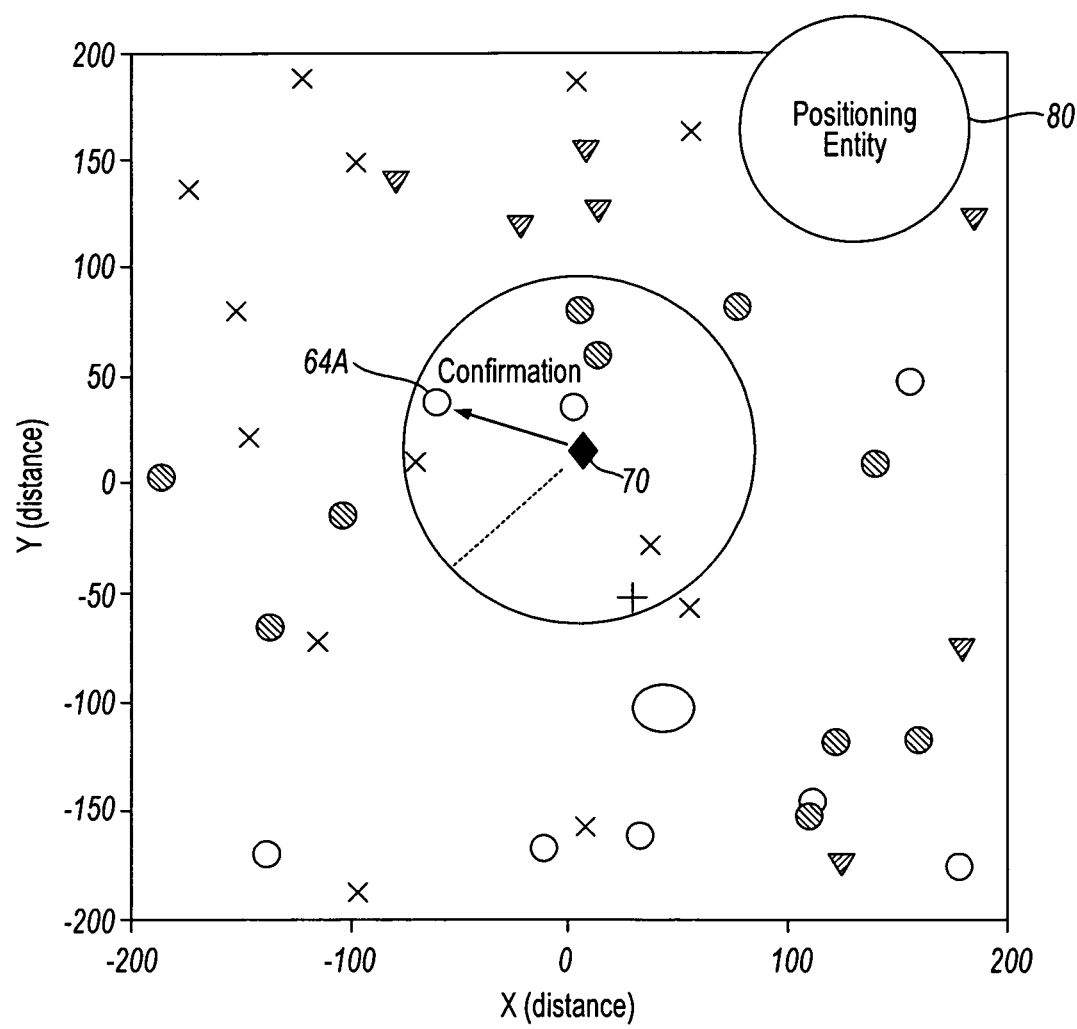

11. The temporary sink then informs the selected sensor that it is selected as the future sink or base station as shown in FIG. 9, unless of course it turns out that the temporary sink is the best candidate.

12. Operation of the network then proceeds with the new sink gathering the sensor data and routing the same to the delivery port, until a trigger event occurs or a predetermined time elapses to cause the algorithm to begin again.

Modification of the First Embodiment

In the following modification, the start of the process does not involve transferring the role of sink to a temporary sink. Instead it finds a "central candidate" to lead the determination of the most suitable sensor to act as the new sink.

The entire method is presented for completeness.

1. The method is triggered in some way, as before.

2. There is a positioning system which is capable of determining and knowing the current centre of gravity of active and relay sensors in the wireless sensor network. The positioning system may either be centralised (a central controller which is aware of the positions of the sensors) or distributed (each sensor may be equipped with a GPS detector, for example). If there is a sensor which is currently closer to the centre of gravity than the current sink, that candidate sensor is informed by that entity that it is the "central candidate" for leading the next steps. Here "central" refers to the centre of gravity of the network rather than the geometric centre of the area covered. The old sink still functions as usual.

3. The central candidate sends a signal that asks all active and relay sensors within its range to evaluate their suitability to become a new sink.

4. Each candidate sink (including the central candidate) asks their surrounding sensors to report back their status and location.

5. Each candidate sink then receives the state and location information and identifies approximately which sensors are currently within its reception range.

6. Each candidate sink asks sensors to send a reference signal which will be employed to determine or estimate the channel information $h_{sx}(t)$ between the candidate and each sensor x.

7. Each candidate sink then determines the maximum rate at which reliable communication is possible at time t between the grid point at potential location j and each relay or active sensor node i as:

$$I_{ji}(t) = \log\left(1 + \frac{P_i|h_{ji}[t]|^2}{d_{ji}^\alpha N_0}\right) \quad (8)$$

where $P_i$ is the transmission power allocated to each sensor node whose value can be, for example, the same for each sensor or a randomly assigned transmission power value using a Gaussian codebook, and $d_{ji}$ is the distance between the candidate grid point and the sensor, this being calculated by the candidate grid point taking into account available location information of the sensors.

8. The candidate sink then determines the total maximum rate for current active and relay links associated with it:

$$I_j(t) = \sum_{i=1}^{K}(I_{ji}(t)) = \sum_{i=1}^{K}\left(\log\left(1 + \frac{P_i|h_{ji}[t]|^2}{d_{ji}^\alpha N_0}\right)\right) \quad (9)$$

where K is the number of active relay and sensor nodes around the candidate's current location.

All the candidates signal an indication of the $I_j(t)$ to the central candidate sink.

9. The central candidate then determines the sensor that can provide the maximum achievable throughput:

$$J(t) = \underset{j}{\operatorname{argmax}}(I_j(t)) \quad (10)$$

10. The central candidate then informs the selected sensor that the latter is selected as the future sink or base station (unless the central candidate itself is selected).

11. The selected sink then informs the old sink that it is no longer the sink and assumes its duties as the new sink.

As will be apparent from the above, the result is that the role of sink 70 moves from one sensor to another. Over time, the sink can migrate far from its original position to adapt to changes in the network, for example as "hot spots" of activity arise in particular parts of the coverage area.

To test the effectiveness of the above algorithm, simulations have been performed on a periodic event basis, in other words assuming that events take place at fixed time points and that between these time points everything stays the same. The parameters for the simulation (in arbitrary length units) are shown in Table 1. It is assumed that sensors move around and/or change state randomly.

TABLE 1

Simulation Parameters

| Parameters | Value |
| --- | --- |
| Dimensions | 400 × 400 |
| Transmission Range | 30 |
| Reception Range (Sink) | 120 |

Figure 10:
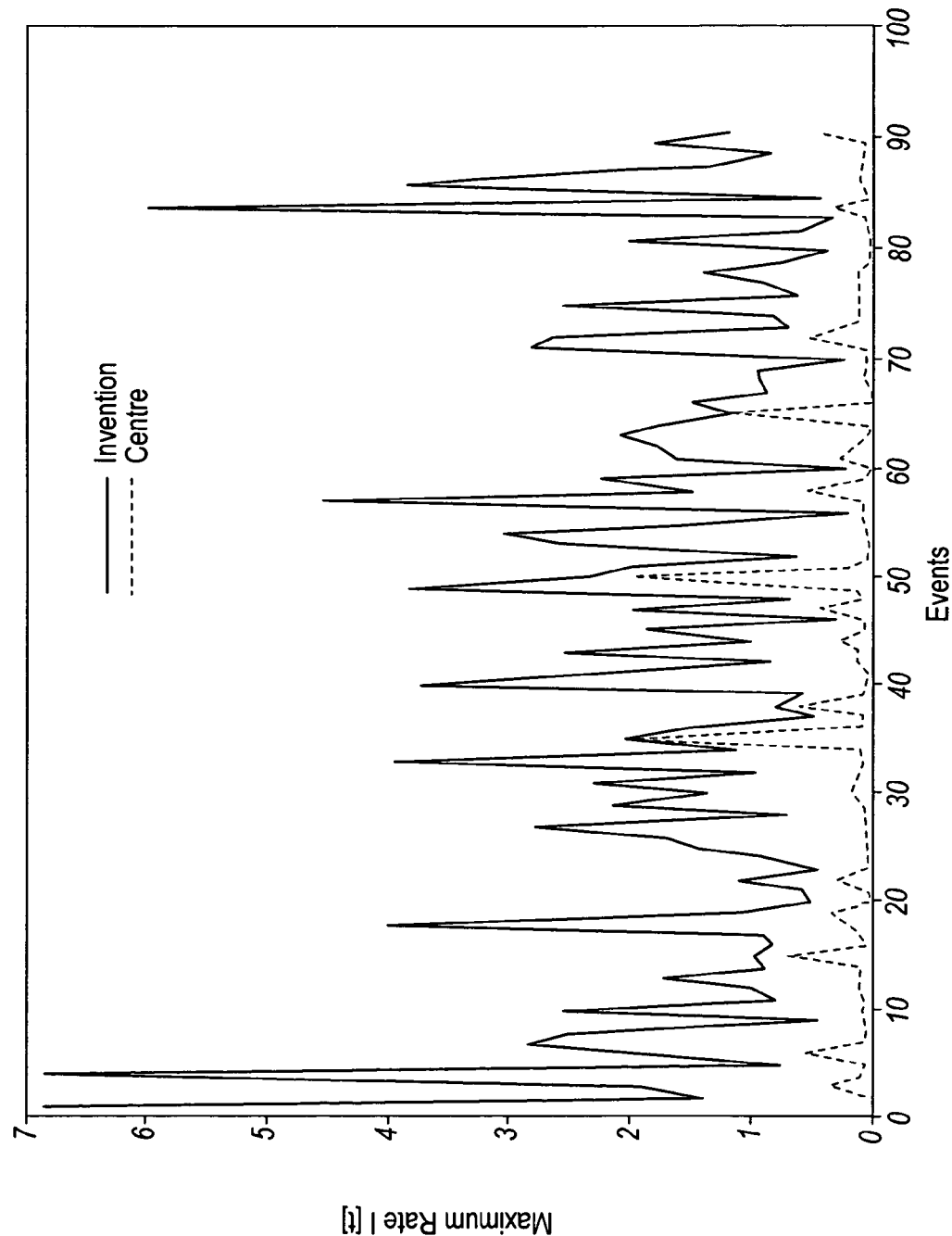
FIGS. 10 and 11 show the results of simulations for indicating the effect of the first embodiment.
Figure 11:
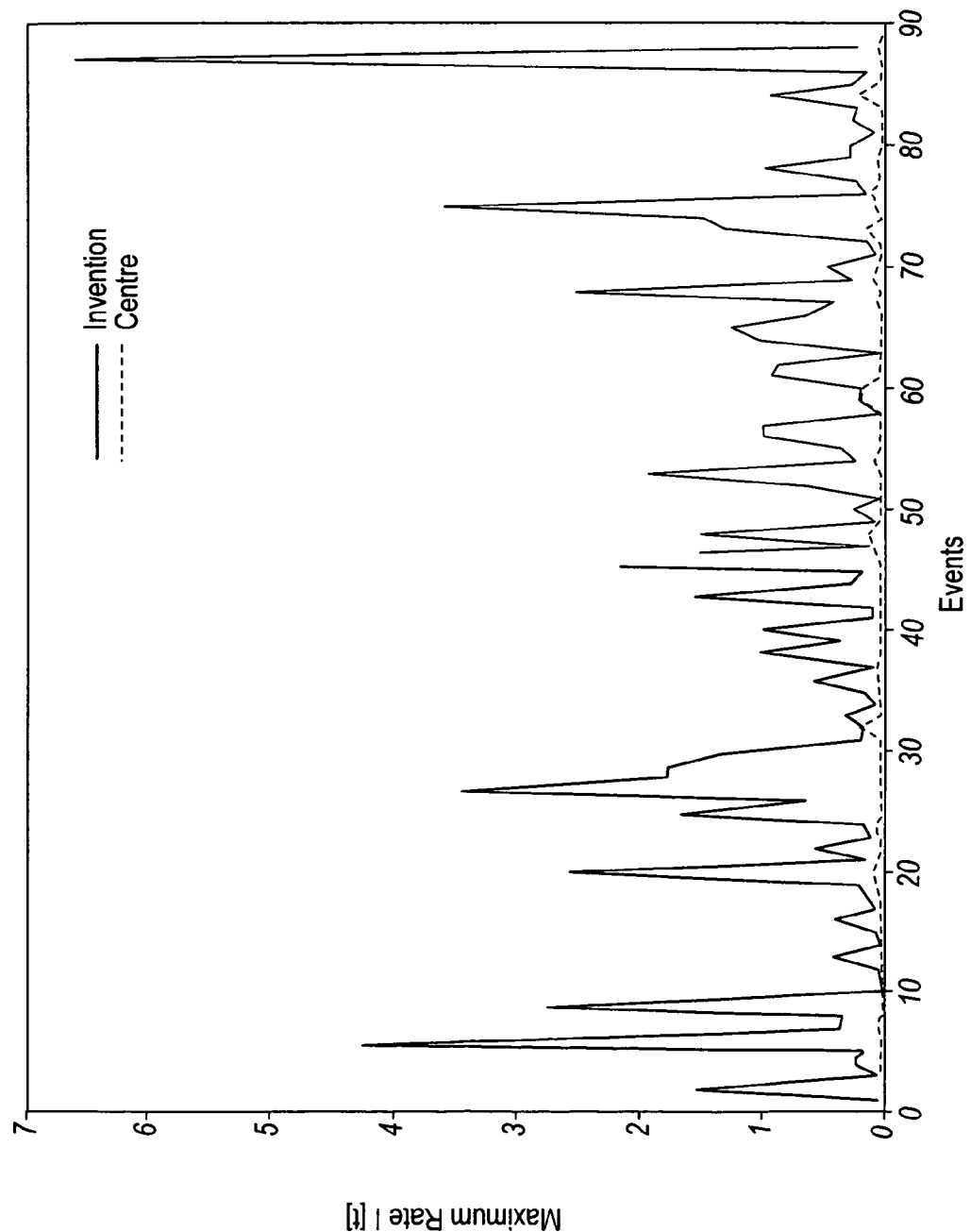

The graphs of FIGS. 10 and 11 show the outcome of 10000 trials for different sensor states. FIG. 10 shows the results for a relatively dense network of 300 mobile sensors, not all of which need be active at the same time. The performance is compared to the case when the sink (base station) is simply placed at the geometric centre of the WSN area. It can be seen that compared to a fixed base station in the centre, the above-described method provides significant improvement in terms of maximum achievable rate. This would eventually translate to a throughput and delay advantage in a practical system.

FIG. 11 shows the performance results for a relatively sparse network of only 60 sensors, showing a similar effect as for the dense network.

Second Embodiment

The second embodiment takes account of the needs of the sensors more completely by introducing the concept of a "desired rate" for transmission by each sensor. Each sensor's desired rate depends on its remaining energy (see FIG. 2 again), the amount of data the sensor needs to transmit, and its distance from the sink (candidate sink).

To reduce battery drain when a sensor is located close to the sink, the sensor might deliberately reduce the transmission rate depending on the remaining energy in its battery. Conversely the sensor should preferably increase the rate when the buffer occupancy is high, so as to ensure that gathered data is passed to the sink in a timely manner. To capture both concepts, a three-dimensional table is provided in each sensor which maps the current energy level, buffer occupancy and distance from the sink to a unique desired transmission rate R so that:

$$R = 3D\_Table(\epsilon(t), d, data) \quad (11)$$

The second embodiment takes advantage of changes of the probability of fulfilling this desired rate over different links, such changes occurring as sensors move around and change their status thus altering the channel properties.

It is assumed that in the current fading environment, the maximum rate I(t) for a reliable communication is random. Assuming that the code length is sufficiently high, the probability that the information transmitted over channel h(t) falls below a normalised desired rate R can be expressed as:

$$P(I(t) < R) = P\left(|h(t)|^2 < \frac{(2^R - 1)N_0}{P_a d^{-\alpha}}\right) \quad (12)$$

The second embodiment proceeds as follows.

1. Some trigger event occurs to initiate the process, as in the first embodiment.

2. The current sink 70 sends its own location to all active and relay sensors within its reception range shown in FIG. 12; this is exemplified by the arrow from sink 70 to active sensor 64A. Note that, by starting the method from the current sink, there is no need for any centralised control such as that provided by the Positioning Entity 80 mentioned previously.

Figure 13:
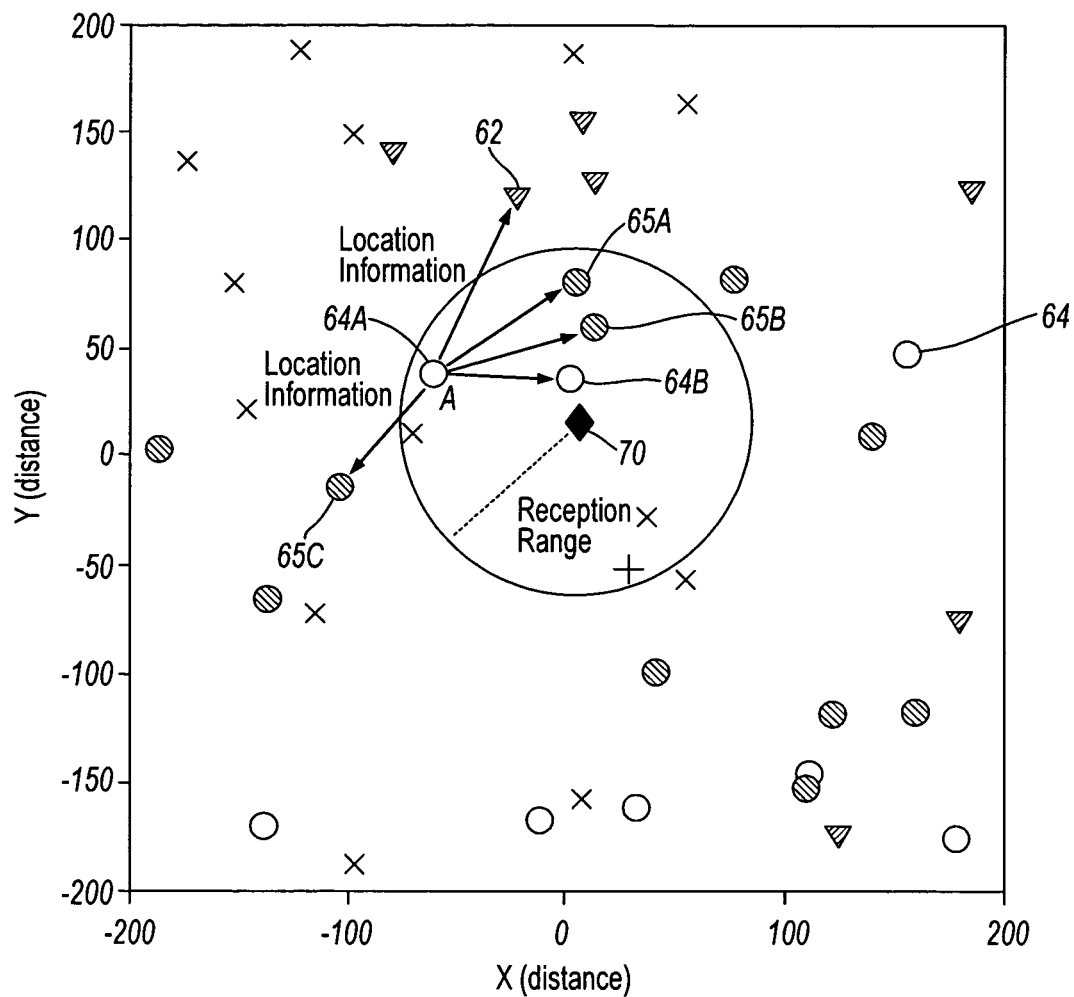

3. The sensors that receive the information assume that they are candidate sinks. Each candidate sensor (including the current sink) as shown in FIG. 13, sends their location information to the surrounding sensors. Thus, for example, sensor 64A informs its position to another active sensor 64B, to relay nodes 65A, 65B and 65C and to inactive node 62.

4. Each sensor after receiving the location information, can calculate its distance from the candidate concerned and considering its current buffer occupancy and current remaining battery energy determines its best preferred maximum rate R based on the three-dimensional table in (11).

Figure 14:
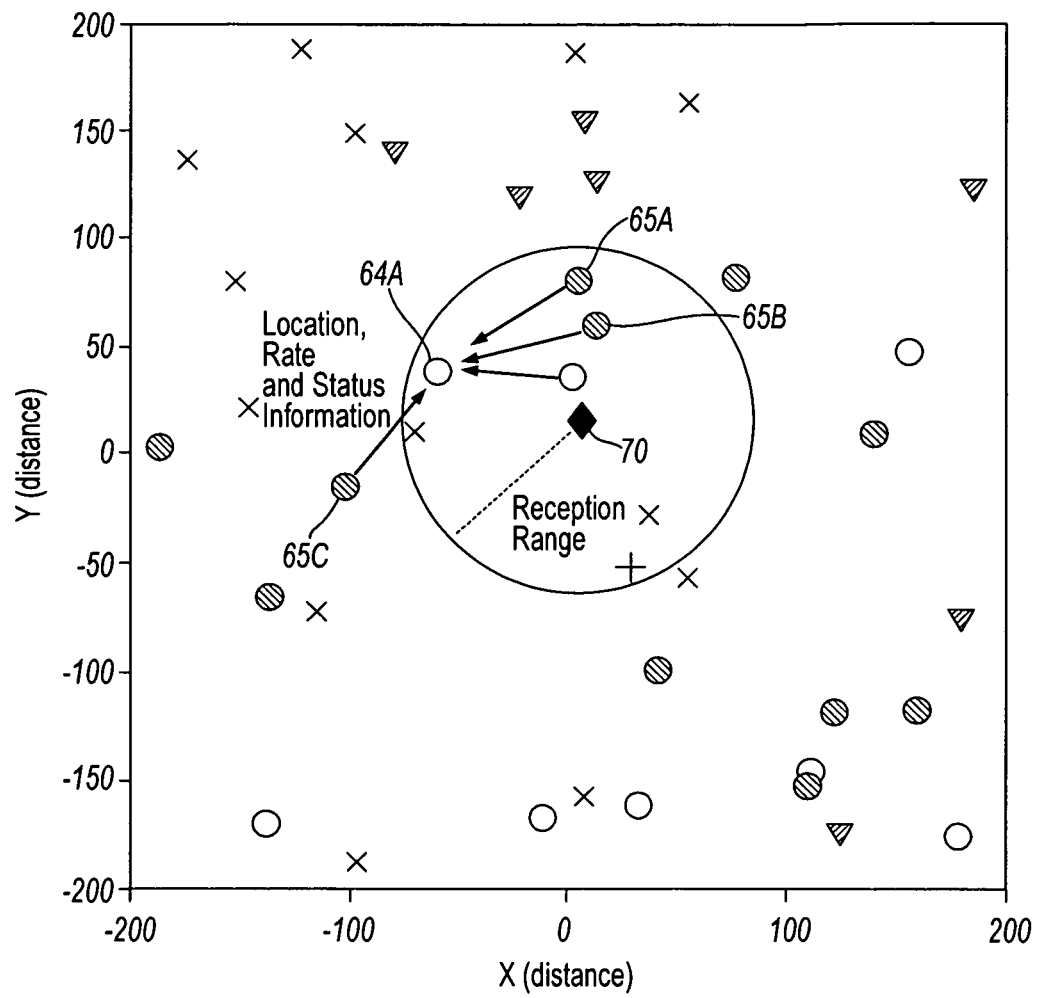

5. Each potential future sink then receives the state, rate and location information as shown in FIG. 14 and identifies approximately which sensors are currently within its reception range. This is done to bring the potential future sink up-to-date with any changes which may have occurred since sending out the original request to its neighbours, as the state of some sensors may already have changed. For example, a previously inactive sensor may now be active.

6. Each candidate sink point such as sensor 64A in FIG. 14 asks sensors to send a reference signal which will be employed to determine or estimate the channel information $h_{sx}(t)$ between the candidate sink and each sensor node x.

7. Each candidate determines the mathematical distance related to the probability in (12) at time t between the candidate sink at potential location j and each relay or active sensor node i as the difference between two metrics, as follows:

$$\omega_{ij}(t) = \frac{(2^{R_i} - 1)N_0}{P_x d_{ji}^{-\alpha}} - |h_{ji}(t)|^2 \quad (13)$$

where $R_i$ is the desired rate reported back by each surrounding sensor i. Thus, the above "distance" is the amount by which the candidate grid point is likely to fall short of meeting the desired rate of each sensor 64 or 65, and not a geographical distance.

8. Then in order to minimize the probability in (12) (i.e. minimising the risk that the channel fails to bear the desired data rate, thus achieving the maximum throughput $I_j(t)$ for each sensor link), the sink 70 first calculates the superposition of so-called "distances" for the entire involved links as:

$$\omega_j(t) = \sum_{i=1}^{K} \omega_{ij}(t) = \sum_{i=1}^{K} \left( \frac{(2^{R_i} - 1)N_0}{P_x d_{ji}^{-\alpha}} - |h_{ji}(t)|^2 \right) \quad (14)$$

where K is the number of active relay and sensor nodes in current location. Here, the term "distance" denotes a shortfall between the channel capacity and the desired rate, and does not necessarily relate to the physical distance covered by the link.

Figure 15:
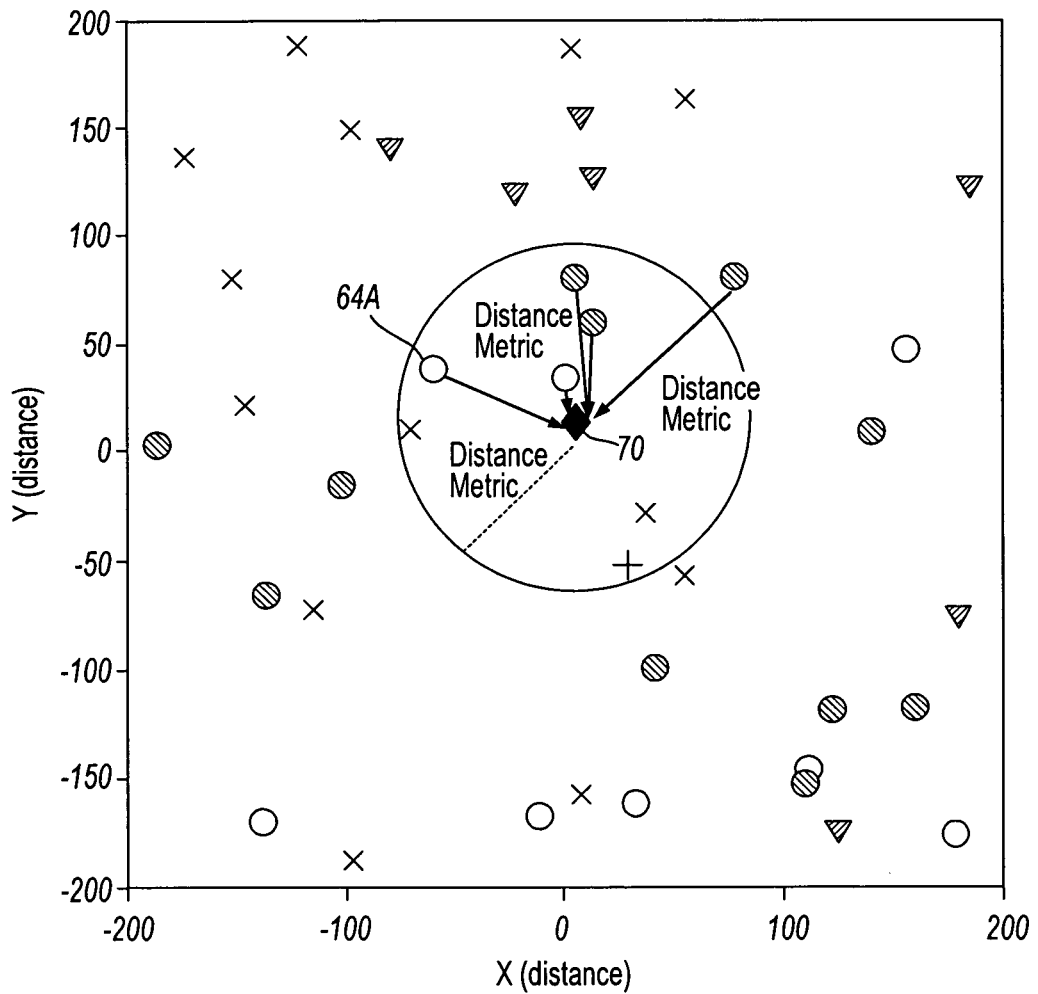

9. All the candidate sink points such as 64A signal an indication of the $\omega_j(t)$ to the current sink 70 as shown in FIG. 15.

10. The current sink 70 then determines the candidate sensor that can provide the minimum achievable distance (i.e. maximum throughput):

$$J(t) = \underset{j}{\operatorname{argmin}}(\omega_j(t)) \quad (15)$$

Figure 16:
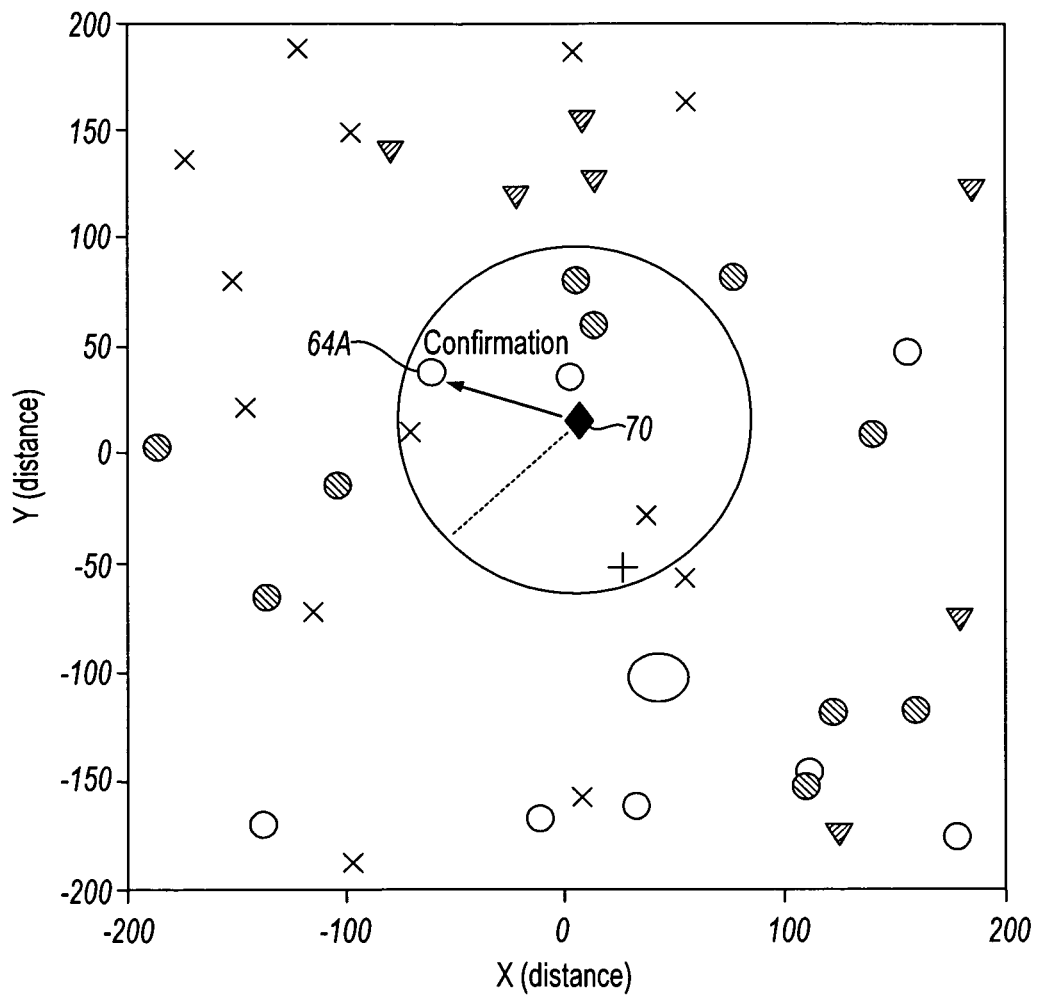

11. Current sink then informs the selected sensor that it is selected as the future sink or base station as shown in FIG. 16. Again, it would be possible that no change of sink is required.

Figure 12:
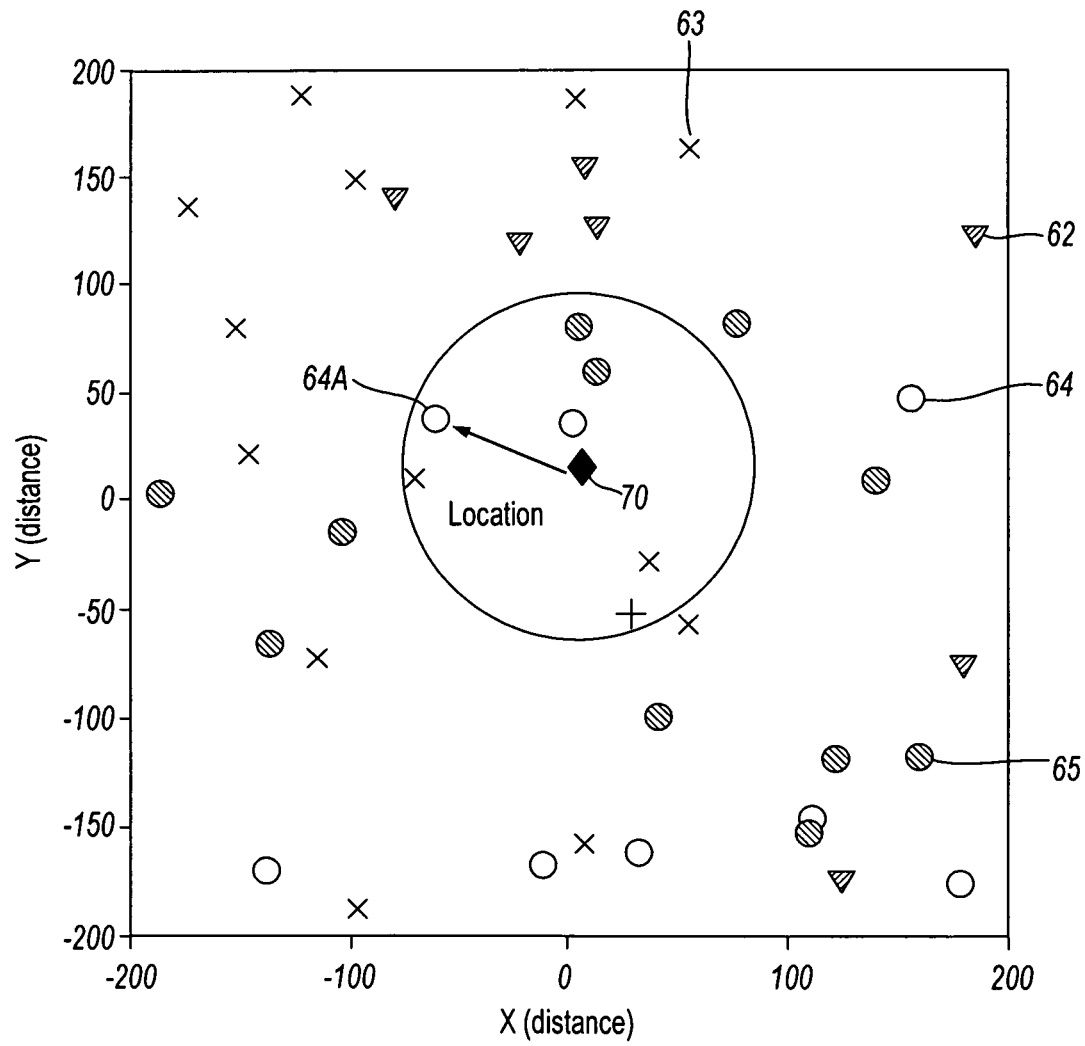
FIGS. 12 to 16 show successive steps in a method of a second embodiment of the present invention.

The above process can be modified along the same lines as mentioned for the first embodiment. Thus, instead of the current sink sending its location to sensors within its range as shown in FIG. 12, a temporary sink or a central candidate could be first designated with the process proceeding from there.

Simulations have been performed on a periodic event basis to test the effect of the above algorithm. The parameters for the simulation are shown in Table 2. It is assumed that sensors have moved around randomly.

TABLE 2

| Simulation Parameters | |
|---|---|
| Parameters | Value |
| Dimensions | 400 × 400 |
| Transmission Range | 30 |
| Reception Range (Sink) | 60 |

Figure 17:
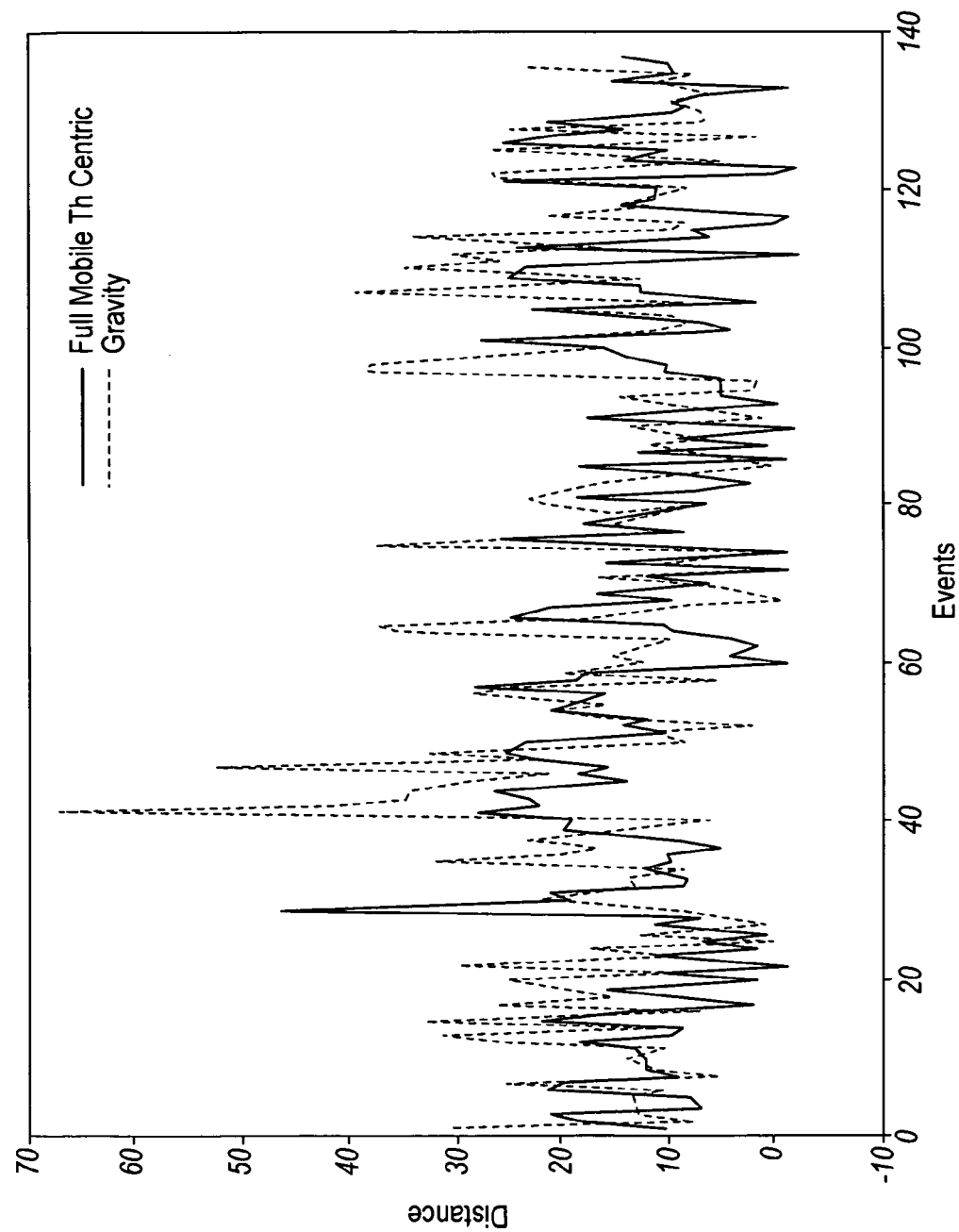
FIGS. 17 to 20 show the results of simulations for indicating the effect of the second embodiment.
Figure 18:
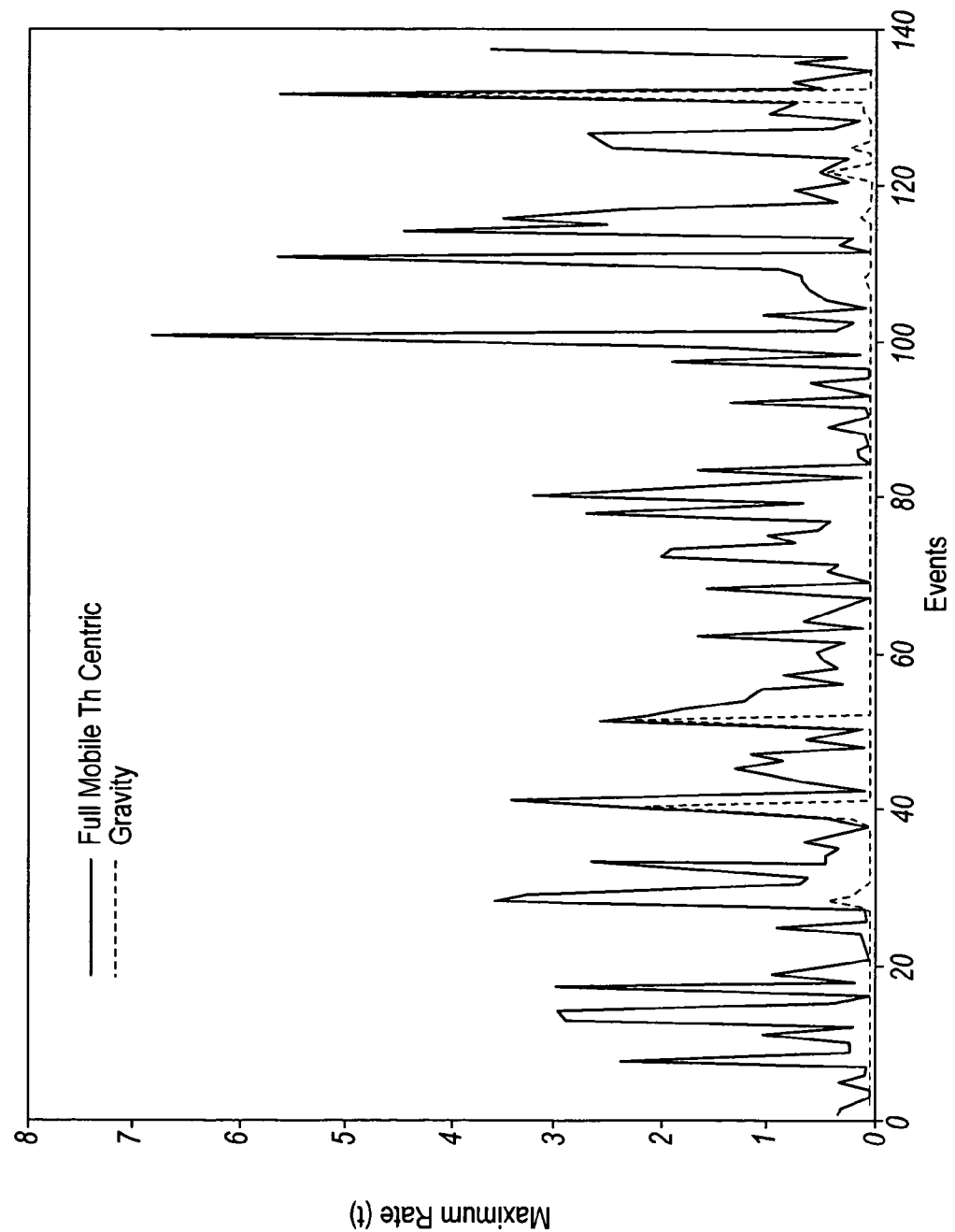

The result presented in following figures is the outcome of 10000 trials for different sensor states. FIGS. 17 and 18 shows the results for a network of 100 mobile sensors, FIG. 17 showing the results in terms of "distance" (in the above, probability-related sense) and FIG. 18 in terms of data rate. The performance is compared to the gravity-oriented approach in which one base station (sink) is located at centre of gravity of WSN area. It can be seen that compared to a fixed base station in the centre of gravity, the second embodiment provides significant improvement in terms of maximum achievable rate. This would eventually translate to a throughput and delay advantage in a practical system. In other words, by identifying the nodes in the network most in need of data delivery and providing the best possible links, the coverage (area in which the maximum efficient amount of data is gathered) can be improved.

Figure 19:
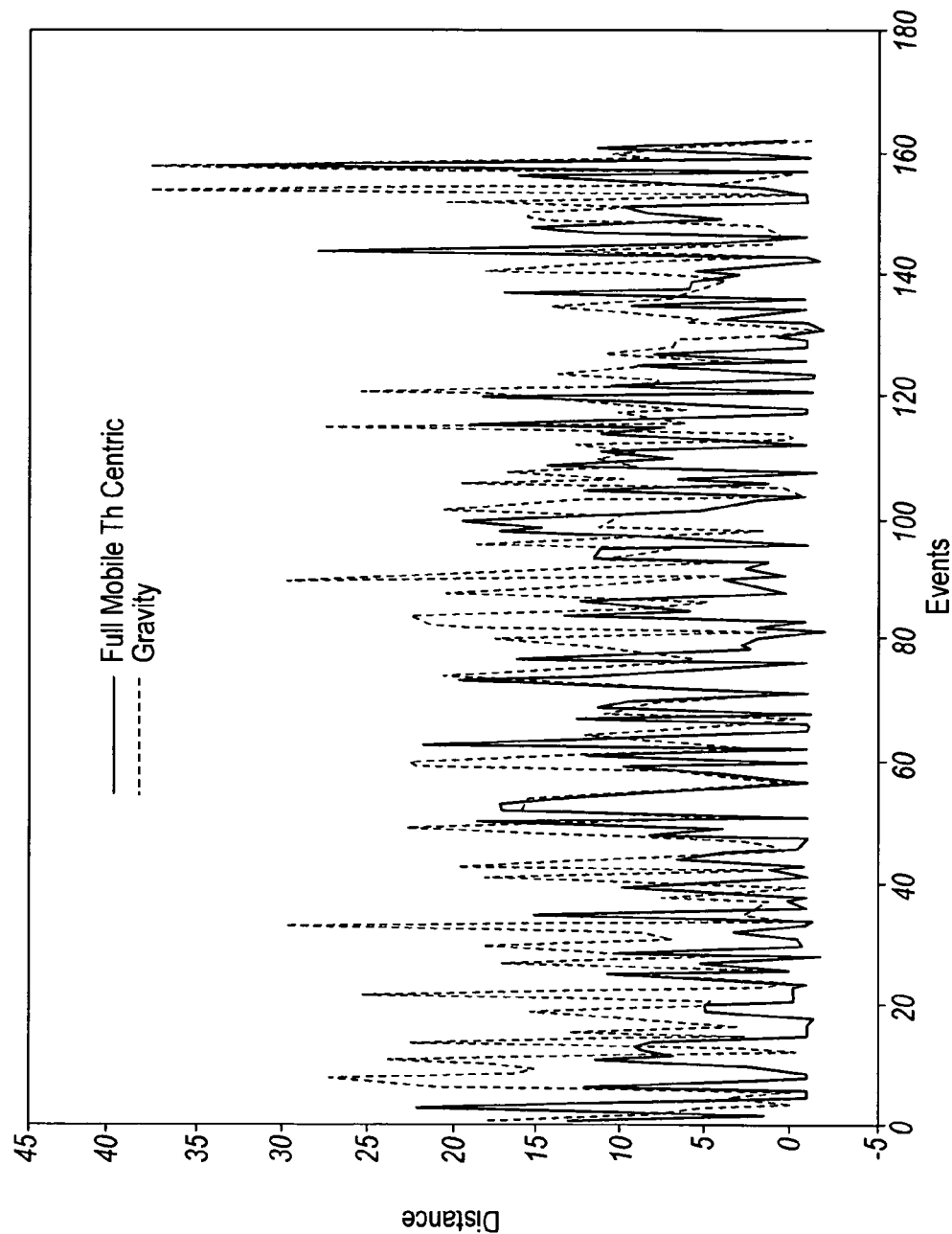
Figure 20:
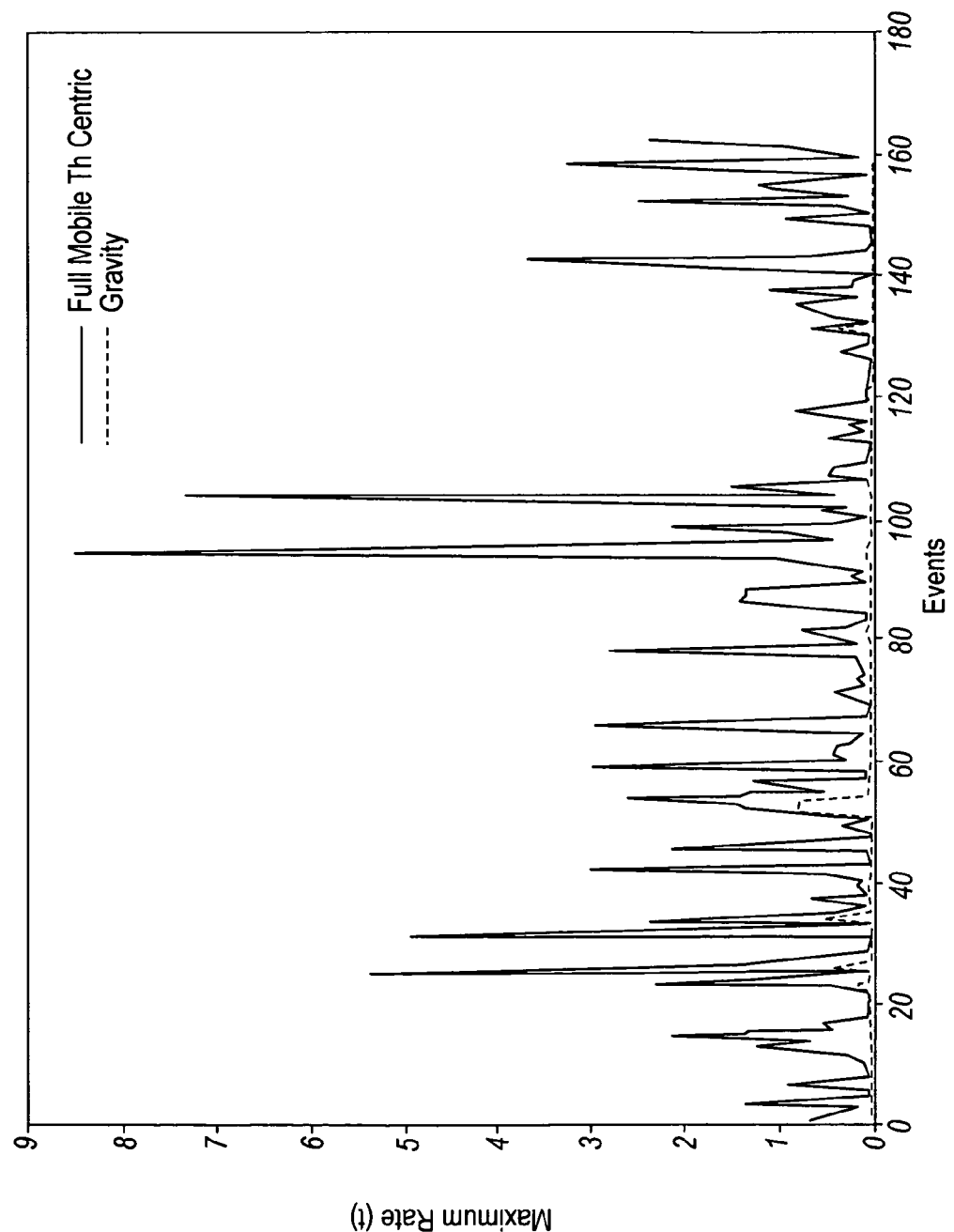

FIGS. 19 and 20 shows corresponding simulation results for a sparse network of only 40 sensors, with a similar advantageous effect.

The above description and simulations have considered as an example a WSN over a square area. As will be apparent to those skilled in the art, such a configuration is considered merely for convenience and the present invention can be applied to any shape of WSN. The present invention may also be applied to part of a WSN extending over a wider area.

In the above description, various calculations have been referred to, performed by the candidate sensors. It may be possible for some or all of such calculations to be replaced by look-up tables along similar lines to the above expression (11). The reference to "calculating means" in the claims is thus to be interpreted broadly.

Thus, embodiments of the present invention involve the following features:

mobile sink positioning where any mobile sensor can be a potential future sink (no fixed sink or permanent sink identity for an entity);

sensors may pass or receive an identity as a sink on the fly and on the move;

a positioning system which is capable of measuring the current centre of gravity of WSN;

a positioning system which informs the sensor which is the closest to the centre of gravity of all the active and relay sensors;

novel selection method to establish a set of candidate moving sensors as the potential future sink;

novel signalling between potential candidate central sink and the other candidate sensors; and novel methods to admit the sinks into the candidate set of sinks.

Features more specific to the second embodiment include:— mobile sink positioning where any mobile sensor can be a potential future sink (no fixed sink or permanent sink identity for an entity) but sensors have a say on the suitable sink based on their own buffer occupancy, remaining sensor energy and the distance from candidate sink;

the group of sensors that have a say on the location of the preferred sink based on the above mentioned three dimensions may change as time progresses;

sensors have a simple three dimensional information look-up table, which translates the above dimensions to the maximum desired rate;

relating the maximum throughput bound to the three dimensions within the sensor; and novel signalling mechanisms between sensor and potential candidate sinks to transfer the three dimensional information.

The effects of embodiments of the present invention may include the following:— improving the throughput in a wireless sensor network;

improving the packet delivery delay in a mobile WSN;

improving the connectivity in dense mobile WSN networks;

improving the connectivity in a sparse WSN network;

improving the sensor life time; and improving the coverage in a mobile WSN.

To summarise, the present invention relates to a wireless sensor network having a plurality of mobile sensor nodes (62, 63, 64, 65), in which a sink (70) is provided and re-positioned as required by assigning the role of sink to one of the mobile sensors at a time. Re-positioning involves finding candidate sinks in the vicinity of a current sink, a temporary sink or a central candidate in the network; judging the suitability of each candidate, for example by estimating the data throughput likely to be achieved if each candidate is selected as the new sink; and transferring the role of sink to the best candidate found. The temporary sink or central candidate may be selected with the aid of a positioning system of the network. Suitability of a candidate sink may take into account a desired transmission rate of each sensor node in the vicinity of a candidate, this desired rate being found from a 3-D look-up table of each sensor.

The invention claimed is:

1. A method of locating a sink for gathering data in a wireless sensor network, the method comprising:
   relaying, via at least some sensors among a plurality of sensors, to direct data to the sink, at least some of the plurality of the sensors being capable of acting as the sink and one of which is currently acting as the sink;
   determining, by a positioning entity, respective locations of active sensors and relay sensors among the plurality of the sensors, the positioning entity choosing a lead sensor;
   selecting, at the lead sensor, two or more of the active sensors or the relay sensors among the plurality of the sensors as candidate sinks;
   finding, at the lead sensor, the suitability of respective candidate sinks to act as the sink for gathering data from the plurality of the sensors according to a calculation producing a result indicating the suitability of the respective candidate sinks for communication with the plurality of the sensors, the calculation estimating a maximum throughput of data targeted to be achieved if a respective candidate sink acts as the sink;
   comparing, at the lead sensor, the result for the respective candidate sinks to determine the most suitable candidate sink; and
   transferring, based on the comparison, the role of the current sink to the determined most suitable candidate sink as a destination for the data.

2. The method according to claim 1 wherein the lead sensor is made a temporary sink prior to the selecting.

3. The method according to claim 1 wherein the lead sensor is made a central candidate but the current sink remains as the sink until the transferring.

4. The method according to claim 1 wherein a respective sensor among the plurality of the sensors has a communication range with the plurality of the sensors and the finding comprises:
   the lead sensor requesting data from the respective candidate sinks comprising the active sensors and the relay sensors within respective range;
   the respective candidate sinks requesting at least the active sensors and the relay sensors within respective communication range to provide at least its location and state, and/or transmit a reference signal, to the respective candidate sinks; and
   the respective candidate sinks calculating a transmission rate possible with the active sensors and the relay sensors within the respective communication range and notifying a result to the lead sensor.

5. The method according to claim 4 wherein the comparing comprises the lead sensor comparing the results received from the respective candidate sinks to determine which respective candidate sink can achieve the maximum throughput.

6. The method according to claim 1 wherein
   a respective sensor among the plurality of the sensors has a communication range with the plurality of the sensors and knowledge of its own location, and
   the selecting comprises the current sink signaling its own location to at least active sensors and relay sensors within its communication range, whereupon the at least active sensors and relay sensors receiving the signaling from the current sink become respective candidate sinks and likewise signal a respective location to the active sensors and the relay sensors within range.

7. The method according to claim 6 wherein the respective sensor has knowledge of its current energy level, buffer occupancy and upon receiving location information from the candidate sinks, uses these parameters to derive and transmit a desired transmission rate.

8. The method according to claim 7 wherein the respective sensor, upon receiving a signal from a candidate sink, transmits a reference signal used by the candidate sink to estimate the channel between the respective sensor and the candidate sink, and the respective candidate sinks derive and transmit a measure of the probability of fulfilling the desired transmission rate for the plurality of the sensors over respective channels so estimated, to provide said result indicating the suitability of the respective candidate sink for communication with the plurality of the sensors.

9. The method according to claim 8 wherein the comparing comprises the current sink comparing the results received from the respective candidate sinks to determine which respective candidate sink can achieve the maximum throughput.

10. A wireless sensor network for locating a sink for gathering data in the wireless sensor network, comprising:
   at least some sensors among a plurality of sensors relaying to direct data to the sink, at least some of the plurality of the sensors being capable of acting as the sink and one of which is currently acting as the sink;
   a positioning entity determining respective locations of active sensors and relay sensors among the plurality of the sensors, the positioning entity choosing a lead sensor;
   the lead sensor selecting two or more of the active sensors or the relay sensors among the plurality of the sensors as candidate sinks;
   the lead sensor finding the suitability of respective candidate sinks to act as the sink for gathering data from the plurality of the sensors according to a calculation producing a result indicating the suitability of the respective candidate sinks for communication with the plurality of the sensors, the calculation estimating a maximum throughput of data targeted to be achieved if a respective candidate sink acts as the sink;
   the lead sensor comparing the result for the respective candidate sinks to determine the most suitable candidate sink, and transferring, based on the comparison, the role of the current sink to the determined most suitable candidate sink as a destination for the data.

* * * * *